United States Patent [19]

Fujii et al.

[11] Patent Number: 5,666,251
[45] Date of Patent: Sep. 9, 1997

[54] CASSETTES HAVING A PLURALITY OF SIZES FOR STORING RECORDING MEDIUMS THEREIN

[75] Inventors: Hiroshi Fujii, Tokyo; Shuichi Ota; Takashi Sawada, both of Kanagawa, all of Japan

[73] Assignee: Sony Corporation, Tokyo, Japan

[21] Appl. No.: 513,670

[22] Filed: Aug. 4, 1995

Related U.S. Application Data

[63] Continuation of Ser. No. 253,909, Jun. 3, 1994, abandoned.

[30] Foreign Application Priority Data

Jun. 7, 1993 [JP] Japan .................. 5-159936

[51] Int. Cl.⁶ .................. G11B 5/008; G11B 23/087
[52] U.S. Cl. .................. 360/132; 360/94
[58] Field of Search .................. 360/60, 69, 71, 360/94, 132, 137

[56] References Cited

U.S. PATENT DOCUMENTS

| | | | |
|---|---|---|---|
| 4,216,509 | 8/1980 | Sato et al. | 360/94 |
| 4,338,644 | 7/1982 | Staar | 360/132 |
| 4,383,285 | 5/1983 | Staar | 360/132 |
| 4,564,878 | 1/1986 | Weavers et al. | 360/132 |
| 4,734,812 | 3/1988 | Tanaka et al. | 360/132 |
| 4,743,984 | 5/1988 | Ryan | 360/60 |
| 4,814,923 | 3/1989 | Kawada et al. | 360/132 |

FOREIGN PATENT DOCUMENTS

| | | |
|---|---|---|
| 0 169 546 | 1/1986 | European Pat. Off. . |
| 0 405 661 | 1/1991 | European Pat. Off. . |
| 0 476 958 | 3/1992 | European Pat. Off. . |
| 0 473 437 | 3/1992 | European Pat. Off. . |
| 0 599 718 | 6/1994 | European Pat. Off. . |
| 61-94287 | 5/1986 | Japan .................. 360/132 |
| 2-41590 | 2/1990 | Japan .................. 360/132 |
| 2-121176 | 5/1990 | Japan .................. 360/132 |
| 4-119577 | 4/1992 | Japan .................. 360/137 |

*Primary Examiner*—Stuart S. Levy
*Assistant Examiner*—William J. Klimowicz
*Attorney, Agent, or Firm*—William S. Frommer; Alvin Sinderbrand

[57] ABSTRACT

A cassette having one of a plurality of sizes, in which each size cassette is adapted for use with a common cassette recording/reproducing apparatus. Each size cassette includes a cassette case holding a recording medium therein, an information device for providing information pertaining to the respective cassette to the cassette recording/reproducing apparatus when the respective cassette is being used with the cassette recording/reproducing apparatus, and a reference hole for positioning the cassette case in the cassette recording/reproducing apparatus. The reference hole and the information device have a constant positional relationship therebetween regardless of the size of the cassette.

20 Claims, 30 Drawing Sheets

F I G. 21
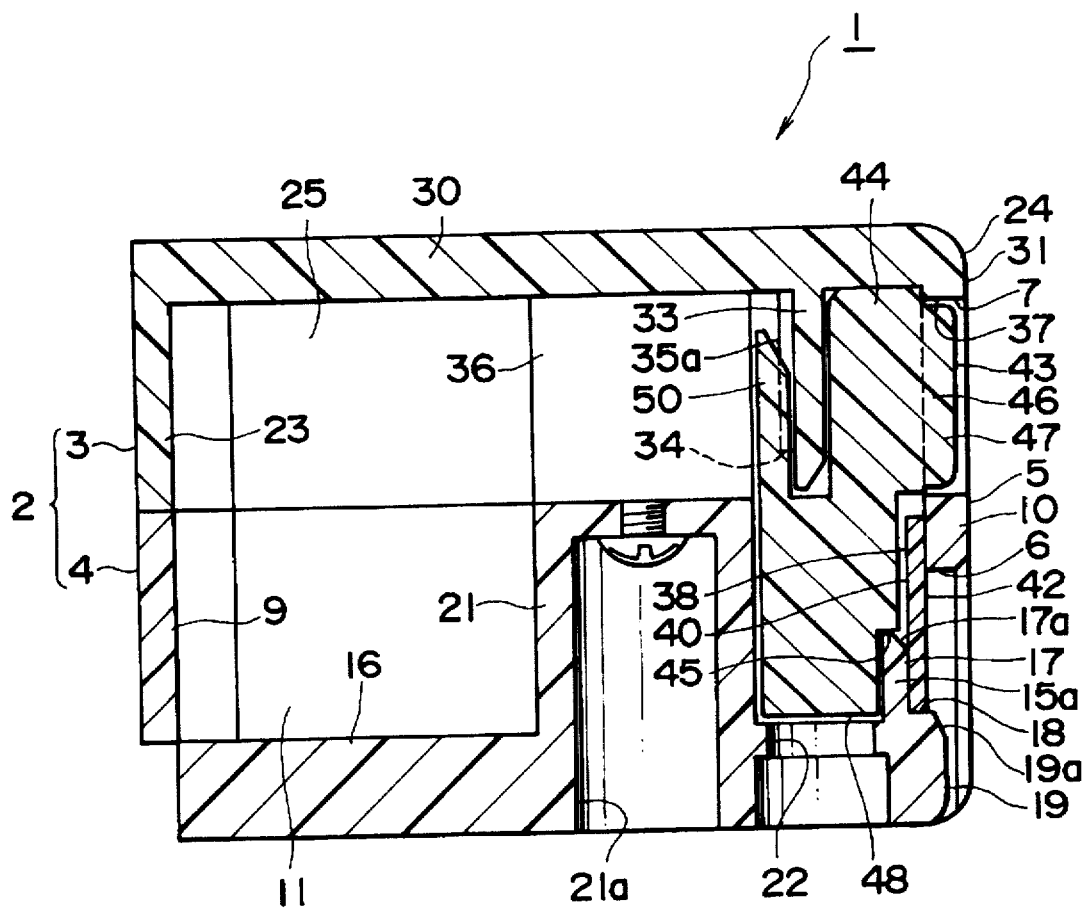

CASSETTES HAVING A PLURALITY OF SIZES FOR STORING RECORDING MEDIUMS THEREIN

This application is a continuation of application Ser. No. 08/253,909, filed Jun. 3, 1994, now abandoned.

BACKGROUND OF THE INVENTION

1. Field of the Invention

The present invention relates to cassettes and, more particularly, to cassettes having a plurality of different sizes and being adaptable for use with a common recording/reproducing apparatus, in which each such cassette has a connector with a plurality of exposed terminals for transferring informational data and a reference hole adapted to receive a positioning member of the recording/reproducing apparatus so as to improve the positional accuracy between a connector on the recording/reproducing apparatus and the connector of the respective cassette so as to provide proper contact of the terminals upon insertion of each cassette into the recording/reproducing apparatus.

2. Description of the Related Art

Recently, cassettes having a recording medium therein, such as magnetic tape, have been proposed which include a plurality of terminals which are exposed on a cassette case thereof to provide information relating to the respective cassette. For example, such information may pertain to the contents of signals recorded on the recording medium, the type of the recording medium, a write protect or write enable condition of the recording medium, and so forth. Such information is supplied to the recording/reproducing apparatus after insertion of the respective cassette into the recording/reproducing apparatus to enable the recording/reproducing apparatus to satisfactorily perform a desired control operation(s) to ensure optimum recording and reproducing operation(s).

Typically, the plurality of terminals are arranged in an area on the back surface of the cassette case of the tape cassette. Such back surface of the cassette case normally provides an optimum location for arranging such terminals. However, such back surface may also be used for affixing a label thereto.

A recording/reproducing apparatus for use with tape cassettes having a plurality of different sizes, such as the recently proposed tape cassettes having a plurality of terminals described above, has been proposed.

Although the above-described recording/reproducing apparatus is adapted for use with the above different sized tape cassettes having a plurality of terminals, properly positioning each such tape cassette in the recording/reproducing apparatus so that the terminals are disposed correctly relative to the connector of the recording/reproducing apparatus may be extremely difficult. To compensate for such difficulty, the terminals may be arranged so as to have larger intervals therebetween which provide an allowance for a positional tolerance between the terminals and the connector. However, as is to be appreciated, such larger intervals cause the area for the terminals to be increased and, as a result, reduce the area available for labels.

OBJECTS AND SUMMARY OF THE INVENTION

An object of the present invention is to provide a cassette having one of a plurality of sizes each having a recording medium and each being adapted for use with a common recording/reproducing apparatus which overcomes the above-described deficiencies.

More specifically, it is an object of the present invention to provide a cassette having one of a plurality of sizes each being adapted for use with a common recording/reproducing apparatus, each such cassette having a recording medium, a connector with a plurality of exposed terminals for enabling the transfer of informational data and a reference hole which is adapted to receive a positioning member of the recording/reproducing apparatus, whereupon all such cassettes have the same positional relationship between the reference hole and the connector.

In accordance with an aspect of the present invention, a cassette having one of a plurality of sizes, in which each size cassette is adapted for use with a common cassette recording/reproducing apparatus is provided. Each size cassette comprises a cassette case holding a recording medium therein; an information device for providing information pertaining to the respective cassette to the cassette recording/reproducing apparatus when the respective cassette is being used with the cassette recording/reproducing apparatus; and a reference hole for positioning the cassette case in the cassette recording/reproducing apparatus. The reference hole and information device have a constant positional relationship therebetween regardless of the size of the cassette.

Since all of the different size tape cassettes have the same positional relationship between the reference hole and the connector, the connectors of such tape cassettes can be properly positioned relative to the connector of the recording/reproducing apparatus by utilizing the reference holes. As a result, the terminals of the connector of each tape cassette may be arranged at reduced intervals therebetween which, in turn, results in a relatively large area for labels even if the terminals are arranged contiguously with the cassette labeling area.

Further, as a result of the above-described positional relationships, errors in the pitches of the terminals of the connector and in the depth of engagement of the connector of the recording/reproducing apparatus and the connector of the tape cassette are minimized or relatively small. Accordingly, the connector can be manufactured at a reduced cost.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIG. 21 is a cross-sectional view along a line XXI—XXI shown in FIG. 19;

FIG. 27A is a bottom view of the small-size cassette having a recording medium in accordance with a modification to the small-size cassette of FIG. 25a;

DETAILED DESCRIPTION OF THE PREFERRED EMBODIMENTS

Figure 1:
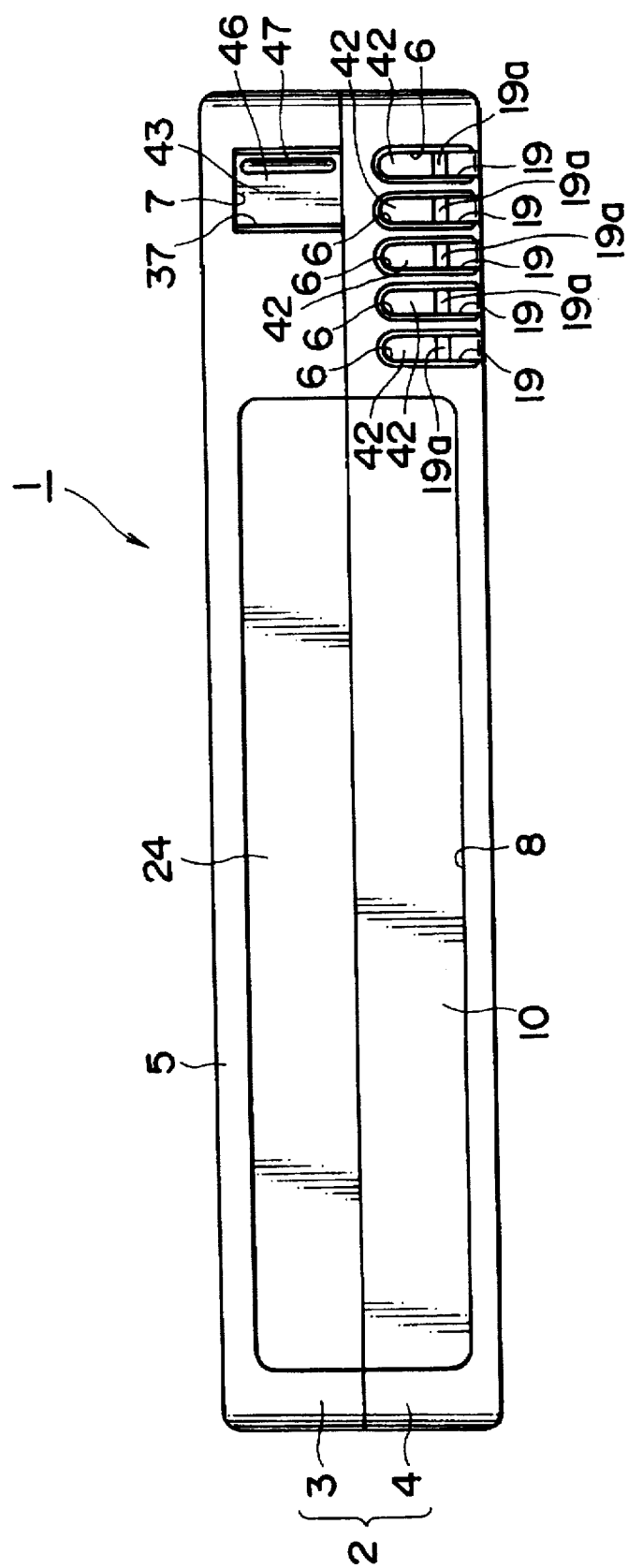
FIG. 1 illustrates a back surface of a large-size cassette in accordance with an embodiment of the present invention.

Cassettes having different sizes in accordance with preferred embodiments of the present invention will now be described with reference to the accompanying drawings. In describing such embodiments two sizes of cassettes, that is, a large-size cassette and a small-size cassette, which are adapted to be loaded in a common recording/reproducing apparatus will be described. Although only two size cassettes will be described hereinafter, the present invention is not so limited and may be applied to any number of sizes of cassettes. Further, each of these cassettes has a recording medium, such as a magnetic tape, contained therein. However, the present invention is not so limited and may, for example, contain other types of recording medium. However, in the following discussion, the present cassettes will be described as tape cassettes, although as just described the present cassette is not so limited.

A large-size tape cassette 1 will be described first with reference to FIGS. 1 to 21.

The large-size tape cassette 1 includes a cassette case 2, which generally has the shape of a laterally elongated, rectangular, flat box. The cassette case 2 includes an upper half 3 and a lower half 4, each generally having a shape of a shallow pan and each having an inside and outside portion. Such cassette case 2 is formed by joining together the inside or open portions of the upper and lower halves 3 and 4, respectively. Although not shown in the figures, accommodated inside the cassette case 2 may be a magnetic tape and two rotatable tape reels around which the magnetic tape is wound with its opposite ends fastened respectively to the tape reels.

Figure 22:
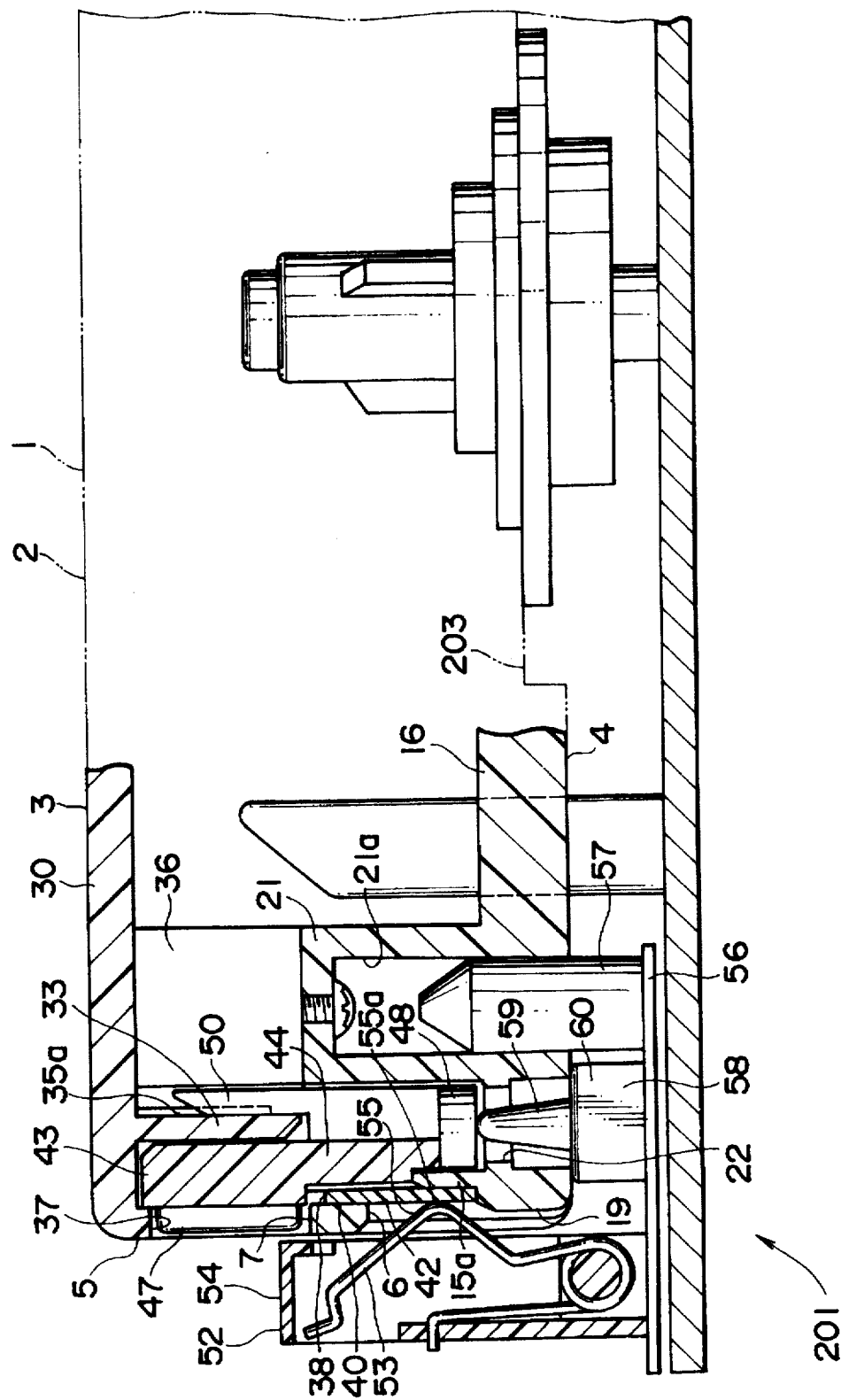
FIG. 22 is a sectional view illustrating the large-size cassette of FIG. 1 mounted in a recording/reproducing apparatus.

The cassette 1 may be utilized with the common recording/reproducing apparatus or video tape recorder (VTR) such as a recording/reproducing apparatus 201 (FIG. 22). In such a situation, the cassette 1 is normally inserted into the VTR such that a back surface 5 is inserted first. The entire back surface 5 of the cassette 1 is illustrated in FIG. 1.

Unless otherwise specifically noted in describing the relative locations of the portions or members of the cassette 1, the right and left thereof will be the right and left as viewed towards the back surface 5 of the cassette case 2 as in FIG. 1, and the rear and front will be in a direction towards the back surface 5 and a direction away from the back surface in a perpendicular direction thereto, respectively.

As shown in FIG. 1, the back surface 5 includes a plurality of slots 6, such as five slots, which are formed or arranged on a lower portion of the right side thereof. The back surface 5 further includes an erase protect window 7 which is formed or arranged on the right side of the upper half 3 above the slots 6. The back surface 5 still further includes a shallow, recessed label area 8. Such label area, which preferably does not include the area for the slots 6 and the erase protect window 7, is adapted for having a label, which may contain information pertaining to the cassette 1, fastened or stuck thereto.

A portion of the lower half 4 located basically in a right rear portion thereof will now be more fully described with reference to FIGS. 1–11.

As shown, for example, in FIGS. 2, 3, 6 and 9, the inside of a right rear portion of the lower half 4 of the cassette case 2 includes a partition wall 9 which has a substantially circular-arc shape and which defines part of a chamber for the tape reels. The partition wall 9 has one end joined to a back wall 10 of the lower half 4 and the other end joined to a right side wall 11 of the lower half 4.

A shallow recess 12 is formed in the inner surface of the back wall 10 in an area between the right end thereof to the position where the partition wall 9 joins the back wall 10 as, for example, shown in FIGS. 2–4, 6, 7, 9 and 10. The shallow recess 12 is formed from a predetermined height on the back wall 10 up to an upper edge thereof.

Figure 5:
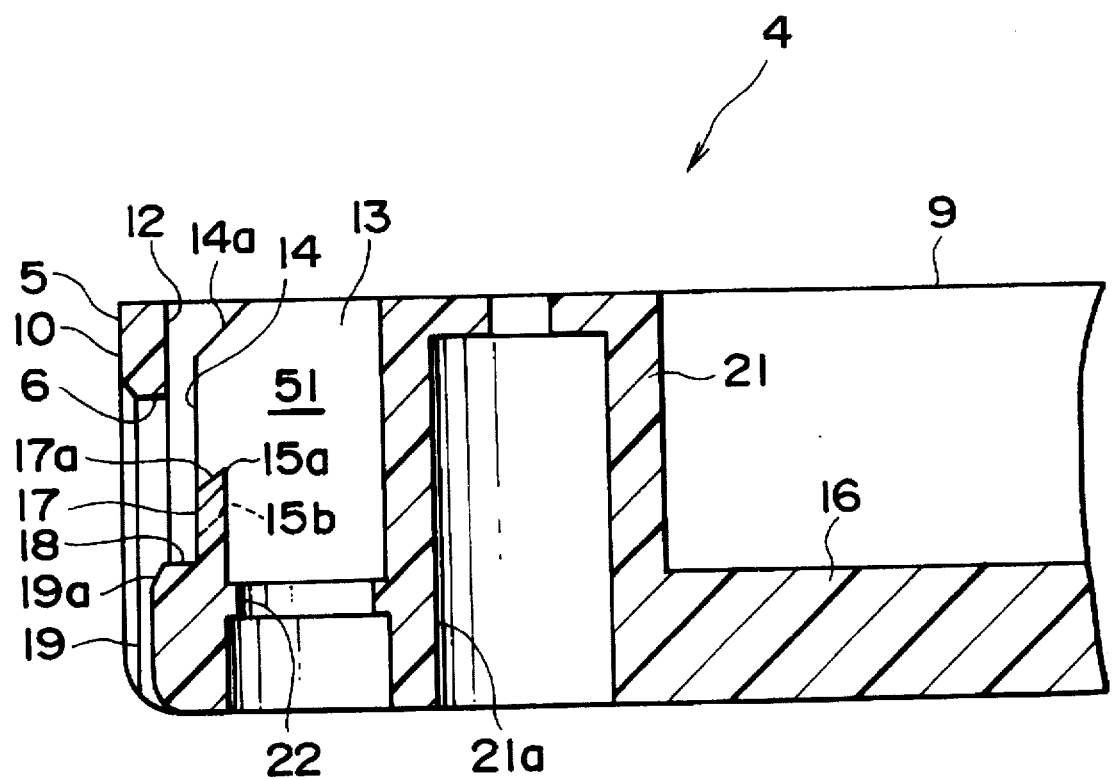
FIG. 5 is a cross-sectional view along a line V—V shown in FIG. 3.
Figure 6:
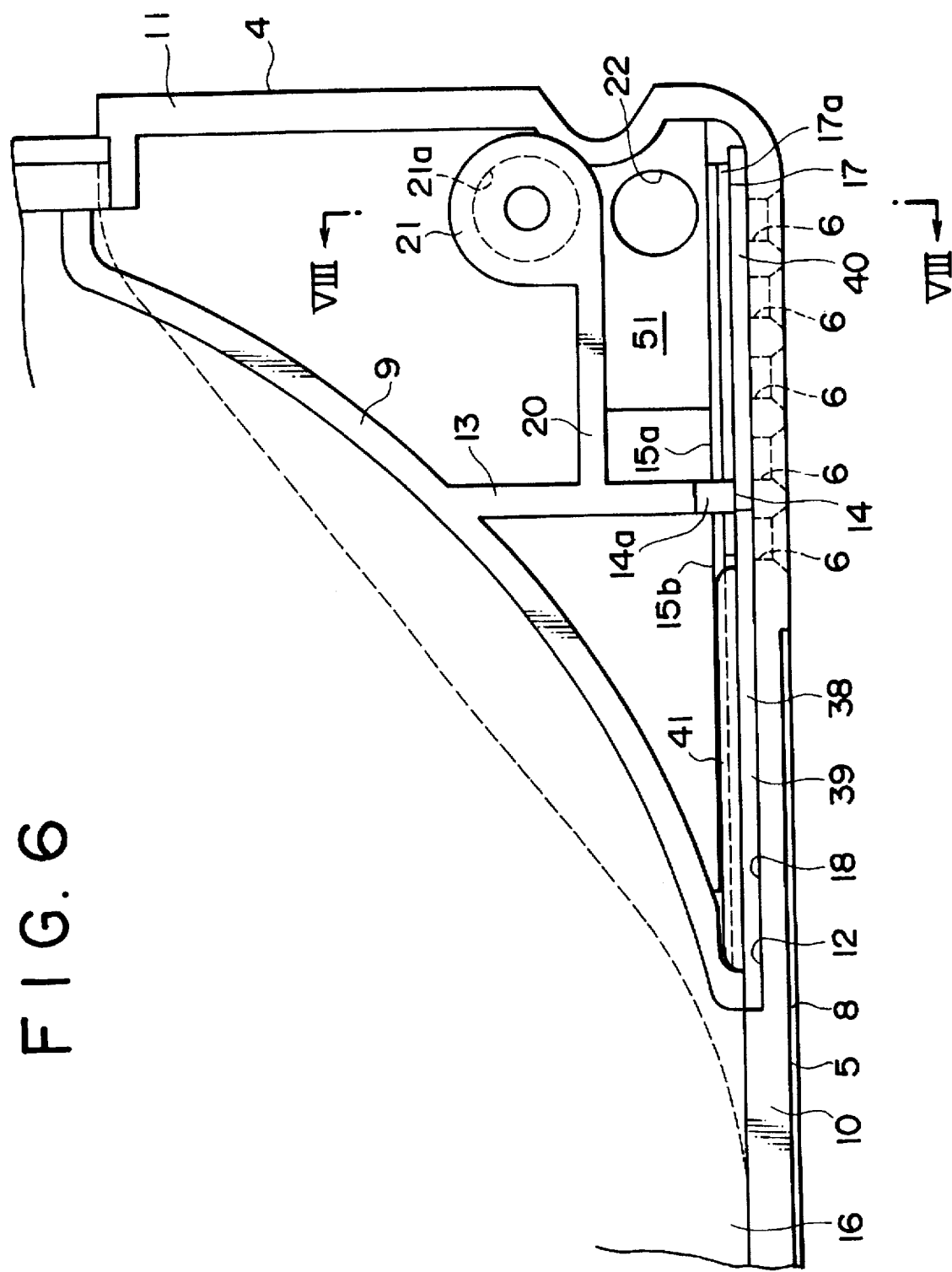
FIG. 6 is an enlarged partial top view of the lower half of the cassette case of the large-size cassette of FIG. 1 illustrating a support plate arranged therein.
Figure 7:
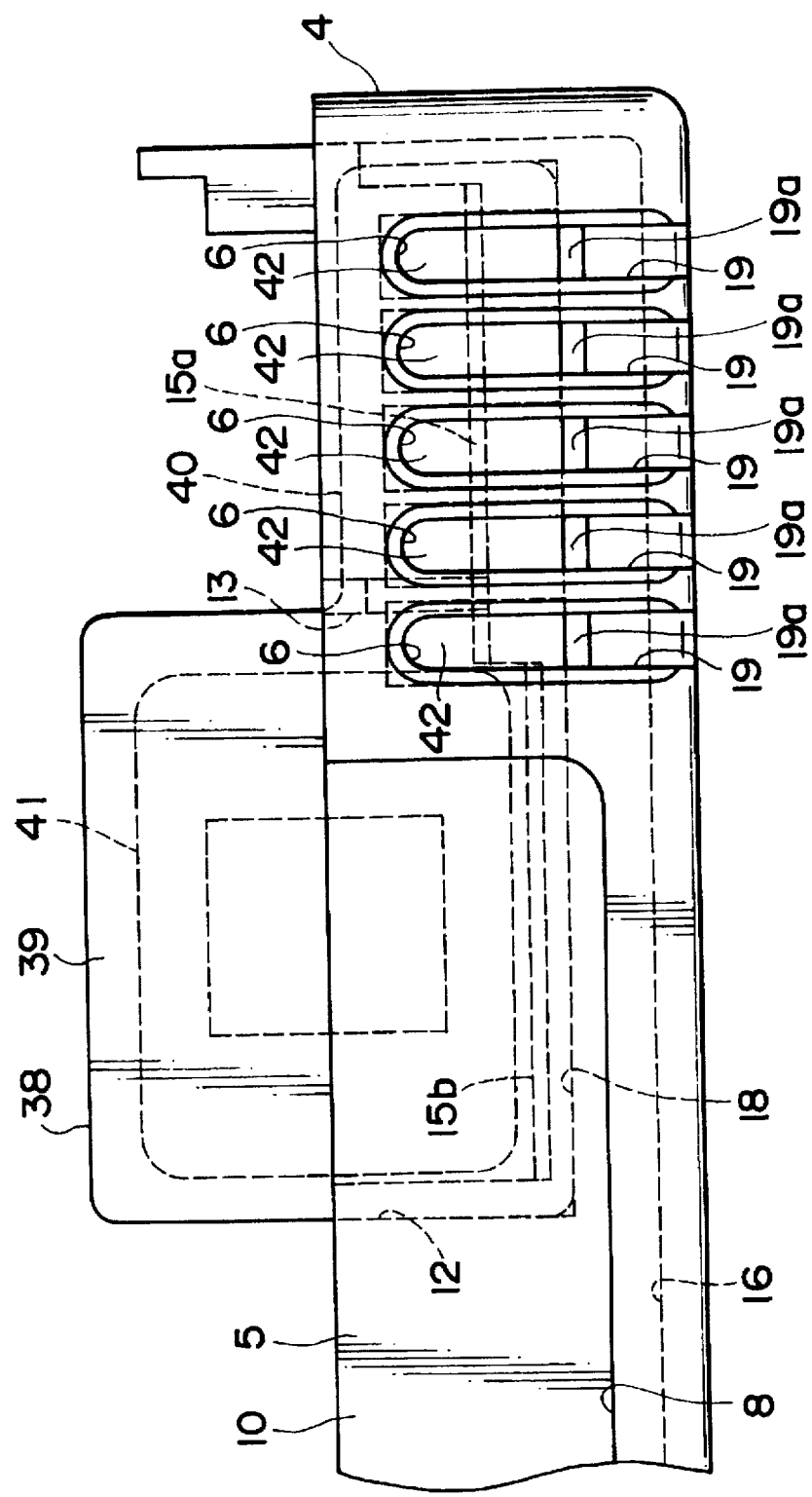
FIG. 7 is an enlarged partial back view of the lower half of the cassette case of the large-size cassette of FIG. 1 illustrating the support plate arranged therein.
Figure 8:
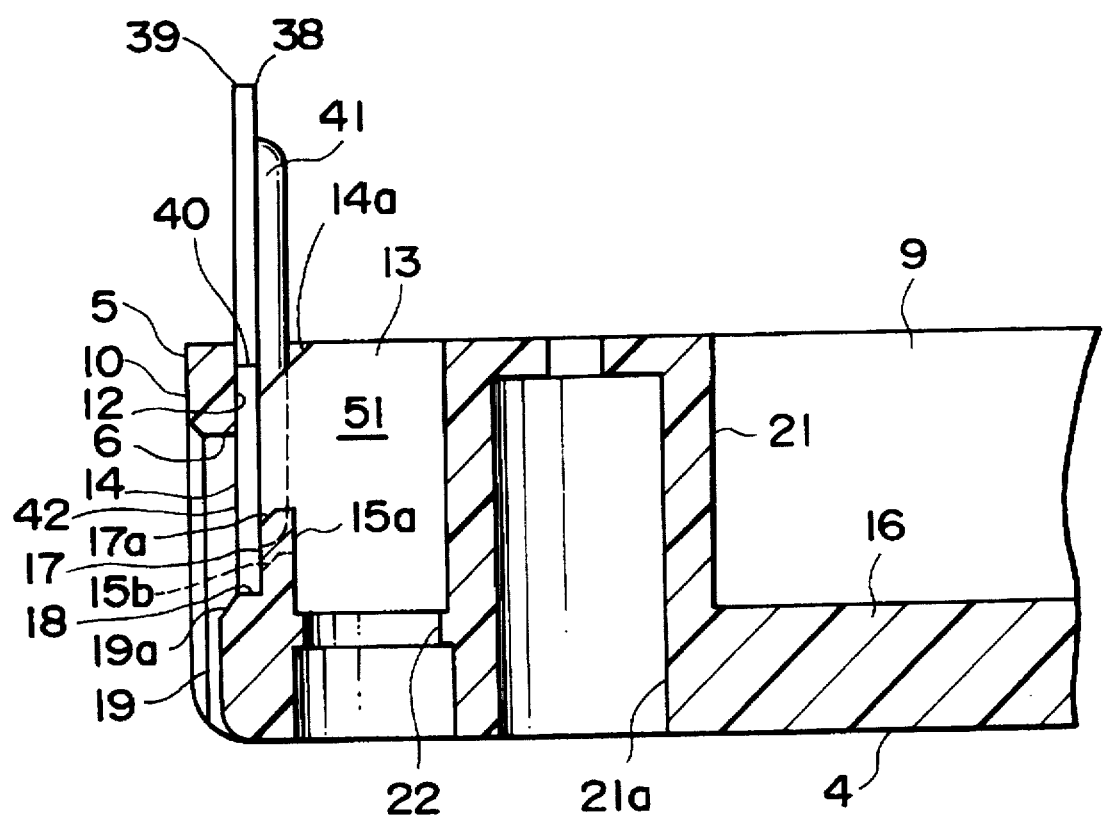
FIG. 8 is a cross-sectional view along a line VIII—VIII shown in FIG. 6.
Figure 9:
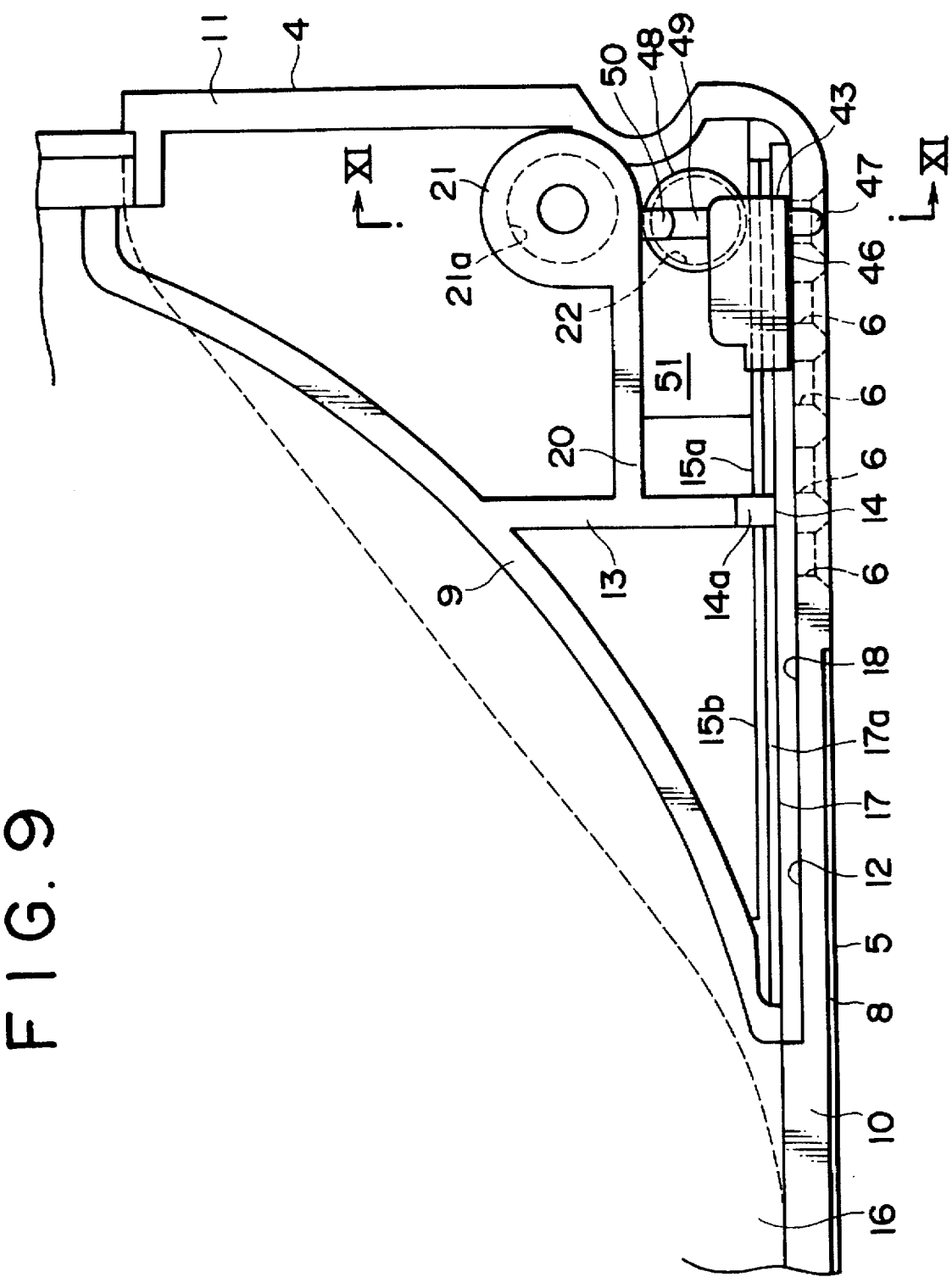
FIG. 9 is an enlarged partial top view of the lower half of the cassette case of the large-size cassette of FIG. 1 illustrating an erase protect member arranged therein.
Figure 10:
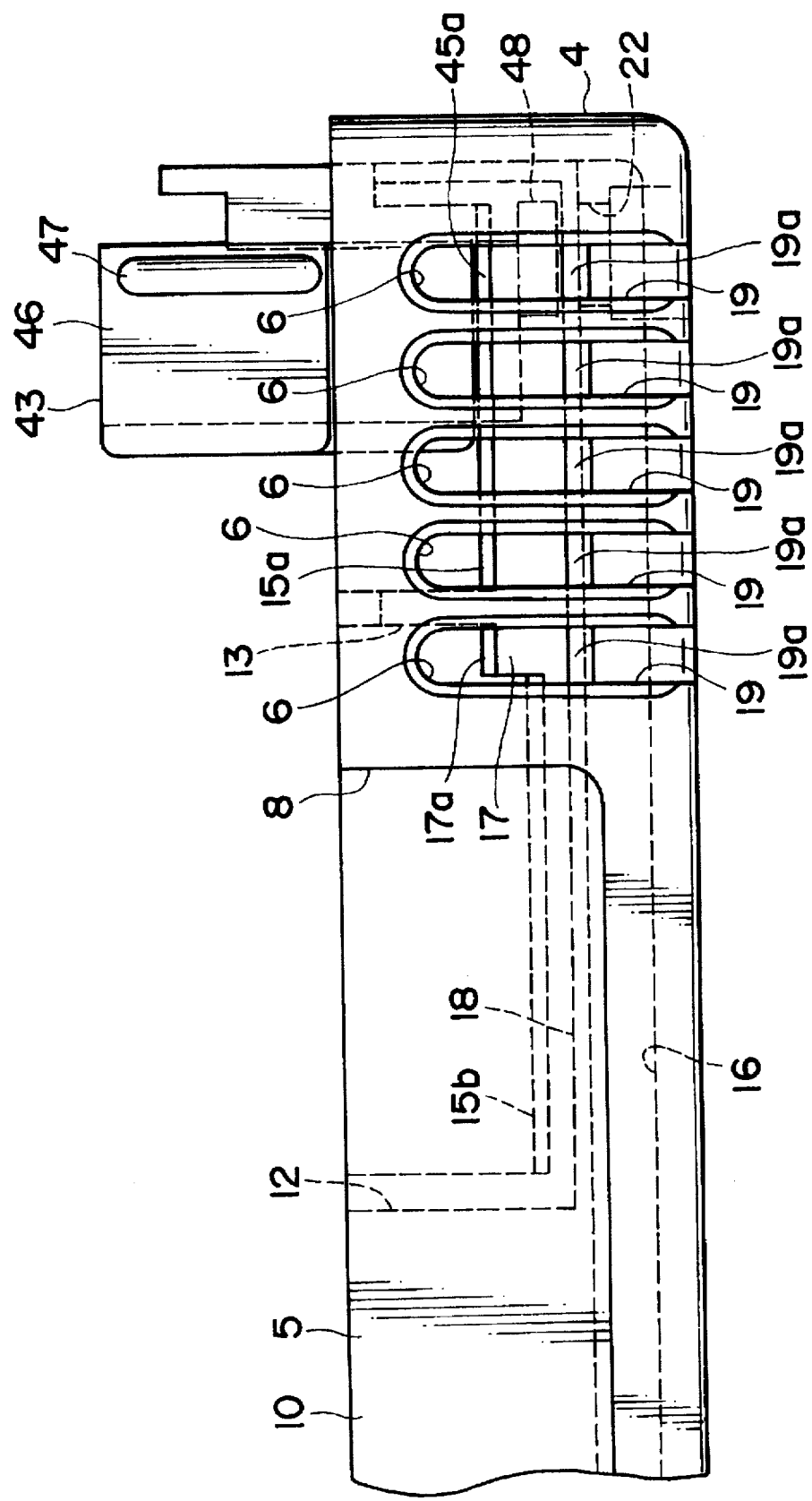
FIG. 10 is an enlarged partial back view of the lower half of the cassette case of the large-size cassette of FIG. 1 illustrating the erase protect member arranged therein.

An intermediate wall 13 extends from approximately the middle of the partition wall 9 towards the rear of the lower half 4 as shown, for example, in FIGS. 2, 3, 6, and 9. Further, as shown in FIG. 5, a back end 14 of the intermediate wall 13 is located adjacent to, but separated by a relatively small distance from, a front or an inner surface of the shallow recess 12. An upper corner of the back end 14 of the intermediate wall 13 is chamfered to form an inclined edge 14a which slopes in an upward/downward direction as, for example, shown in FIGS. 2 and 5.

Holding walls 15a and 15b rise from a bottom wall 16 of the lower half 4 in the rear right part of the lower half as, for example, shown in FIGS. 3, 5, 6 and 8. The amount in which the holding walls 15a and 15b rise from the inner surface of the bottom wall 16 is approximately half, or less than half, the amount in which the back wall 10 rises from the inner surface of the bottom wall 16. The holding walls 15a and 15b are arranged so as to be separated by relatively small distances from the bottom inner surface of the shallow recess 12. The holding walls 15a and 15b have back surfaces 17 which are aligned with the back end 14 of the intermediate wall 13. Upper portions of the back surfaces 17 of the holding walls 15a and 15b have inclined surfaces 17a which slope in an upward/downward direction.

A groove 18 is formed by the bottom surface of the recess 12, the back surfaces 17 of the holding walls 15a and 15b, and the back end 14 of the intermediate wall 13, as, for example, shown in FIGS. 3, 5, 6, 8, 9 and 11.

The previously mentioned slots 6 are formed in the back wall 10 so as to open into the recess 12. Upper ends of the slots 6 are located slightly below an upper end of the back wall 10 of the lower half 4. Guide grooves 19 are formed in an area below each of the slots 6 in the outer surface of the back wall 10 and, as such, merge respectively into the slots 6 (see, for example, FIGS. 1, 2, 4 and 5). Inclined surfaces 19a are formed on upper ends of the guide grooves 19 and are inclined or slope in an upward/downward direction (see, for example, FIGS. 5 and 8).

A limiting wall 20 is formed in the rear right portion of the lower half 4 and is arranged therein so as to extend from approximately the middle of the intermediate wall 13 to the right side wall 11, as shown, for example, in FIGS. 2, 3, 6 and 9. A boss 21 is formed on the front surface of the limiting wall 20. A reference hole 21a is formed in the bottom wall 16 at a location corresponding to the boss 21.

An accidental erasure protection or erase protect hole 22 is formed in the bottom wall 16. As shown, for example, in FIGS. 3, 5, 6, 8, 9 and 11, such erase protect hole is located in the bottom wall 16 in a right rear portion of the lower half 4 substantially behind the boss 21 in an area defined by the back wall 10, the right side wall 11, the intermediate wall 13 and the limiting wall 20. The reference hole 21a and the erase protect hole 22 are arranged so as to be relatively close to each other.

The portion on the upper half 3 located in a right rear part thereof and corresponding to that previously described in the lower half 4 will now be described with reference to FIGS. 12–14.

The inside portion of the upper half 3 includes a partition wall 23. The partition wall 23, like the partition wall 9 of the lower half 4, has a substantially circular-arc shape and defines part of the chamber for the tape reels. The partition wall 23 has a location corresponding to that of the partition wall 9. That is, the partition wall 23 is formed on the inside portion of the rear right area of the upper half 3 as, for example, shown in FIG. 12. One end of the partition wall 23 is joined to a back wall 24 of the upper half 3, while the other end is joined to a right side wall 25 of such upper half.

A shallow recess 26 is formed in the inner surface of the back wall 24 from its lower end up to a predetermined height from the lower end thereof. The shallow recess 26 is arranged in an area between the right end of the back wall 24 and the position where the partition wall 23 is joined to the back wall 24 as, for example, shown in FIGS. 12 and 13. The shallow recess 26 corresponds to the shallow recess 12 of the lower half 4 previously described.

An intermediate wall 27 is formed in the upper half 3 which corresponds to the intermediate wall 13 in the lower half 4. That is, as shown in FIG. 12, the intermediate wall 27 extends from approximately the middle of the partition wall 23 towards the rear of the upper half 3. Further, as shown in FIG. 14, a back end 28 of the intermediate wall 27 is located in front of, but separated by a relatively small distance from, the shallow recess 26. A lower corner of the back end 28 of the intermediate wall 27 is chambered so as to form an inclined edge 28a which slopes in an upward/downward direction, as shown in FIG. 14.

Figure 12:
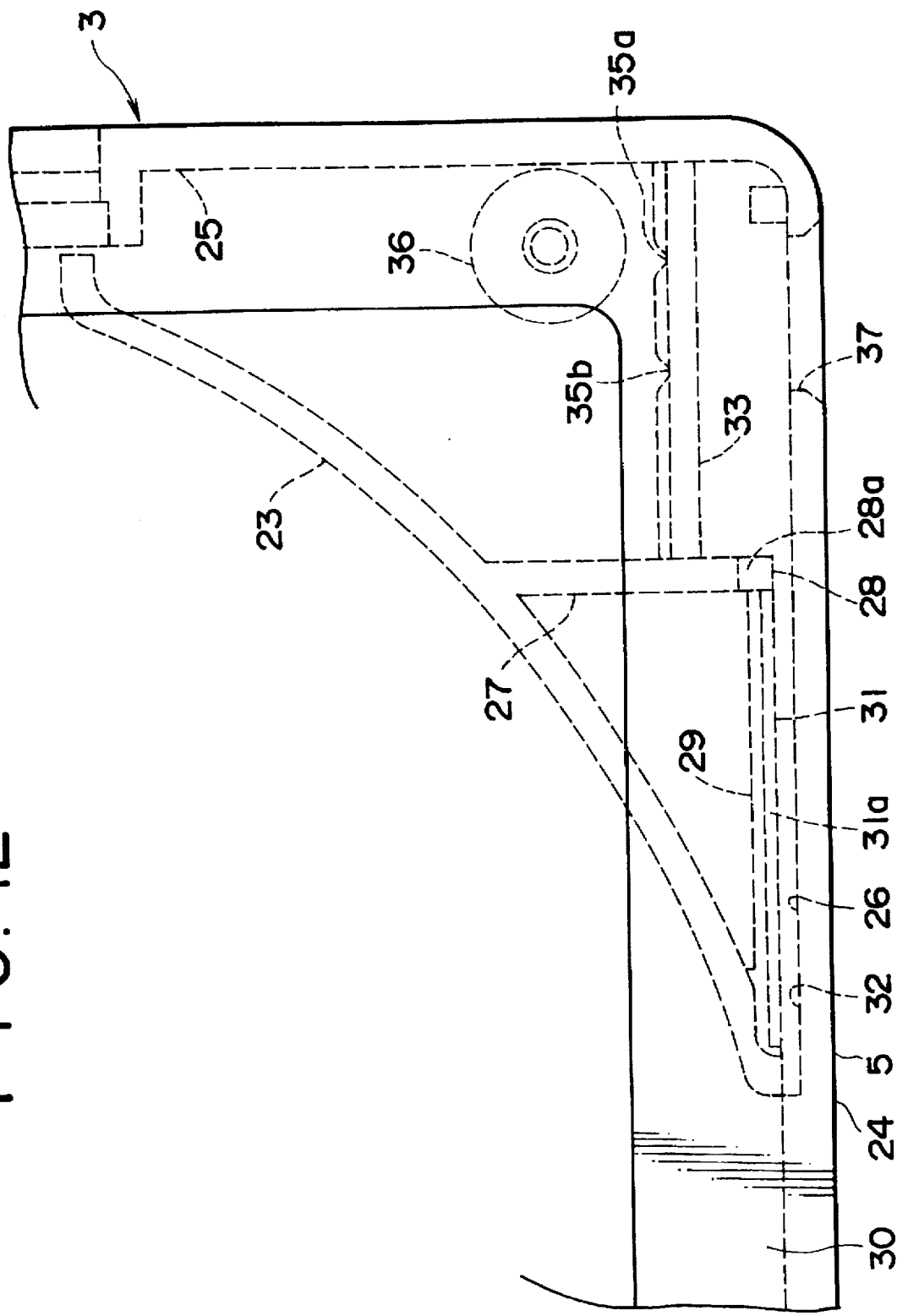
FIG. 12 is an enlarged partial top view of an upper half of the cassette case of the large-size cassette of FIG. 1.
Figure 14:
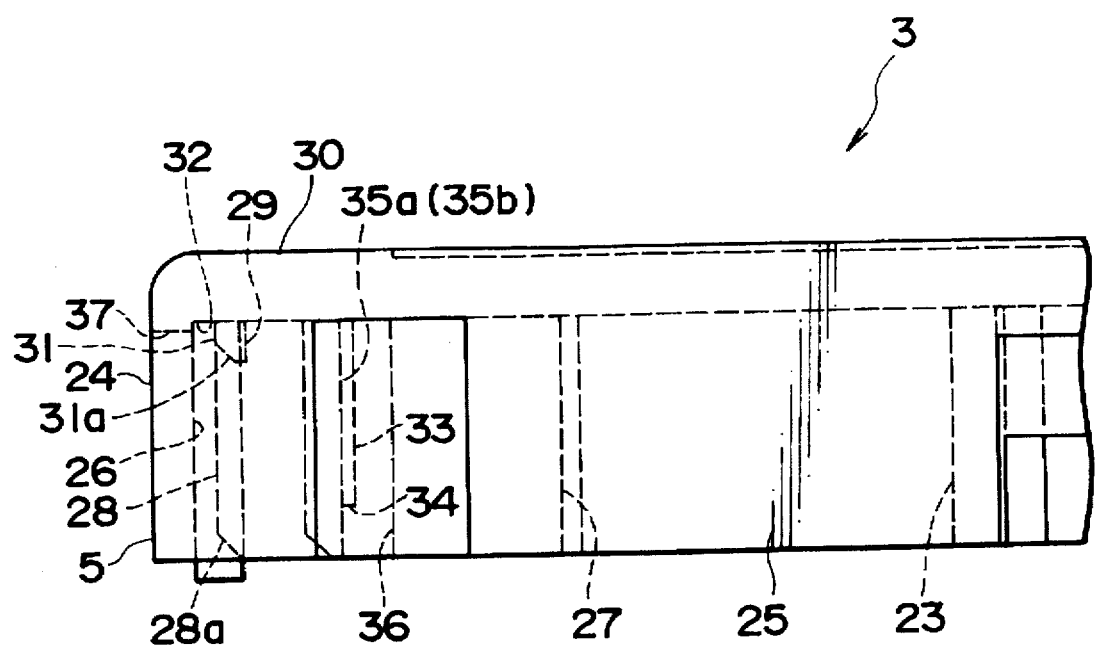
FIG. 14 is an enlarged partial right side view of the upper half of the cassette case of the large-size cassette.
Figure 15:
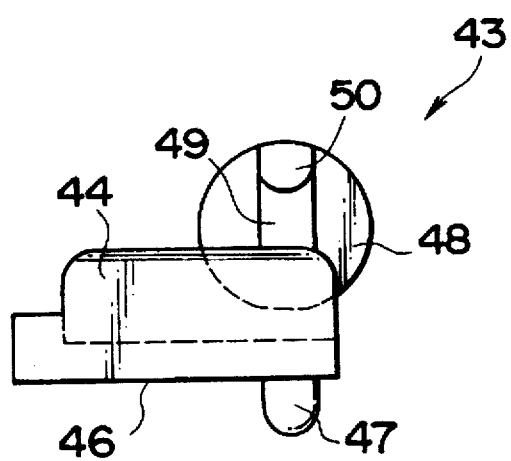
FIG. 15 is an enlarged top view of the erase protect member.
Figure 16:
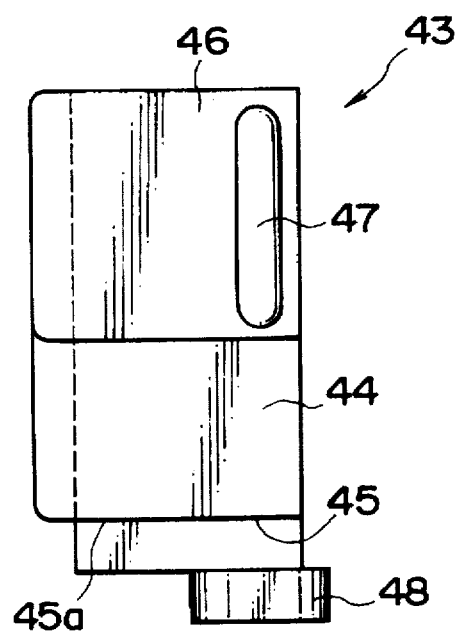
FIG. 16 is an enlarged back view of the erase protect member.

A holding wall 29 extends downward from a top wall 30 of the upper half 3 between the intermediate wall 27 and one end of the partition wall 23, as shown, for example, in FIGS. 12 and 14. A back surface 31 of the holding wall 29 is aligned with the back end 28 of the intermediate wall 27. The lower end of the back surface 31 of the holding wall 29 is chamfered to form an inclined surface 31a which slopes in an upward/downward direction, as shown in FIG. 14. The amount in which the holding wall 29 extends from the inner surface of the top wall 30 is approximately ⅓ the amount in which the back wall 24 extends from the inner surface of the top wall.

Figure 13:
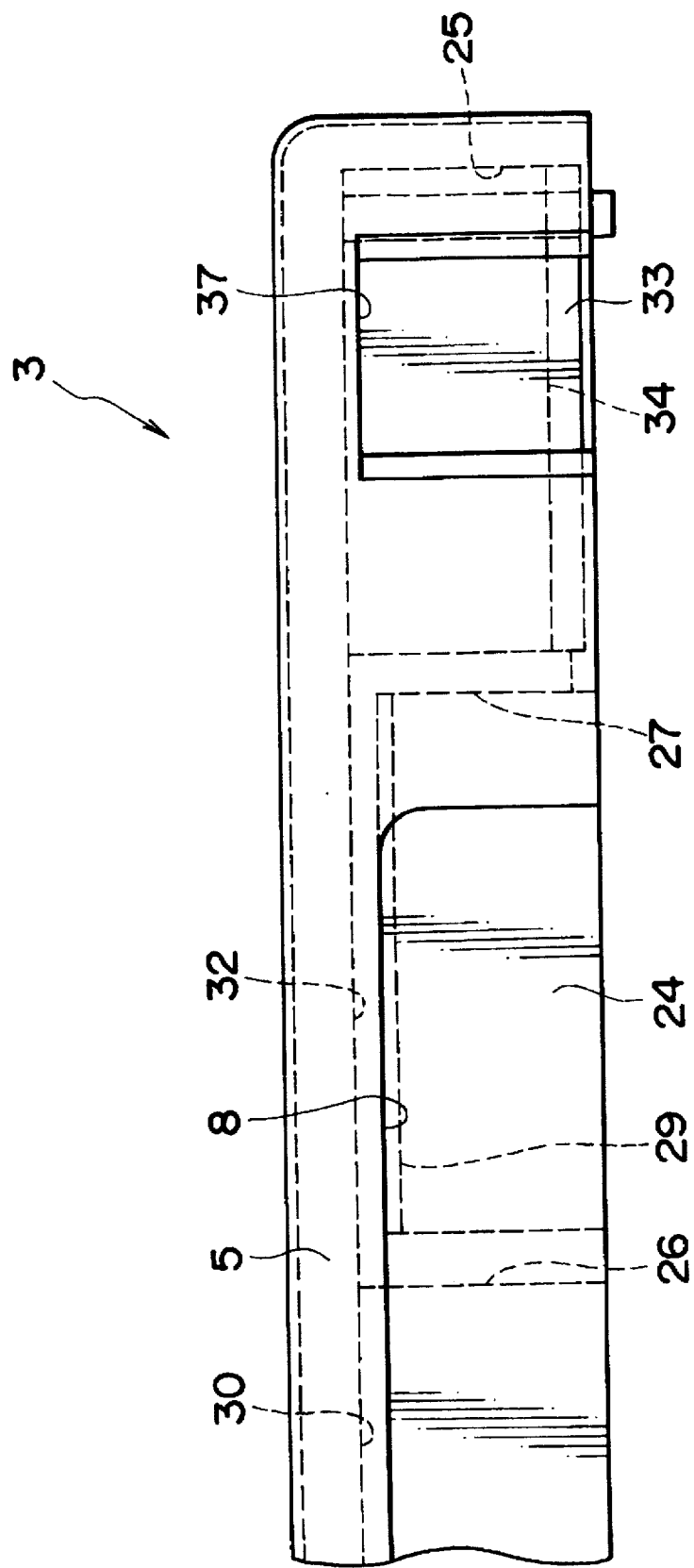
FIG. 13 is an enlarged partial back view of the upper half of the cassette case of the large-size cassette of FIG. 1.

As shown in FIGS. 12–14, a groove 32 is formed between the back surface 31 and the bottom surface of the shallow recess 26.

A limiting wall 33 extends between a rear portion of the intermediate wall 27 and the right side wall 25 as shown in FIG. 12. Such limiting wall 33 protrudes from the inner surface of the top wall 30 an amount which is substantially equal to the amount which the back wall 24 protrudes from the inner surface of the top wall as shown in FIG. 14.

As shown in FIGS. 13 and 14, a recess 34 is formed along the entire length of the lower area of the front surface of the limiting wall 33. Two vertical click notches 35a and 35b are respectively formed in the right portion and the approximate center of the front surface of the limiting wall 33, excluding the portion of such front surface having the recess 34, as shown on FIGS. 12 and 14. As shown therein, such click notches extend in a substantially upward/downward direction in the front surface of the limiting wall 33.

A boss 36 projects downward from the top wall 30 at a location corresponding to that of the boss 21 (FIG. 2) of the lower half 4. That is, as shown in FIG. 12, such boss 36 is located slightly in front of the right end of the limiting wall 33.

As shown in FIGS. 12–14, the right end of the back wall 24 includes a rectangular aperture 37, which may be arranged so as to have vertical edges slightly longer than its horizontal edge. When the upper and lower halves 3 and 4 are joined together, as shown in FIG. 1, the aperture 37 and the upper edge of the back wall 10 of the lower half 4 form the erase protect window 7.

Figure 2:
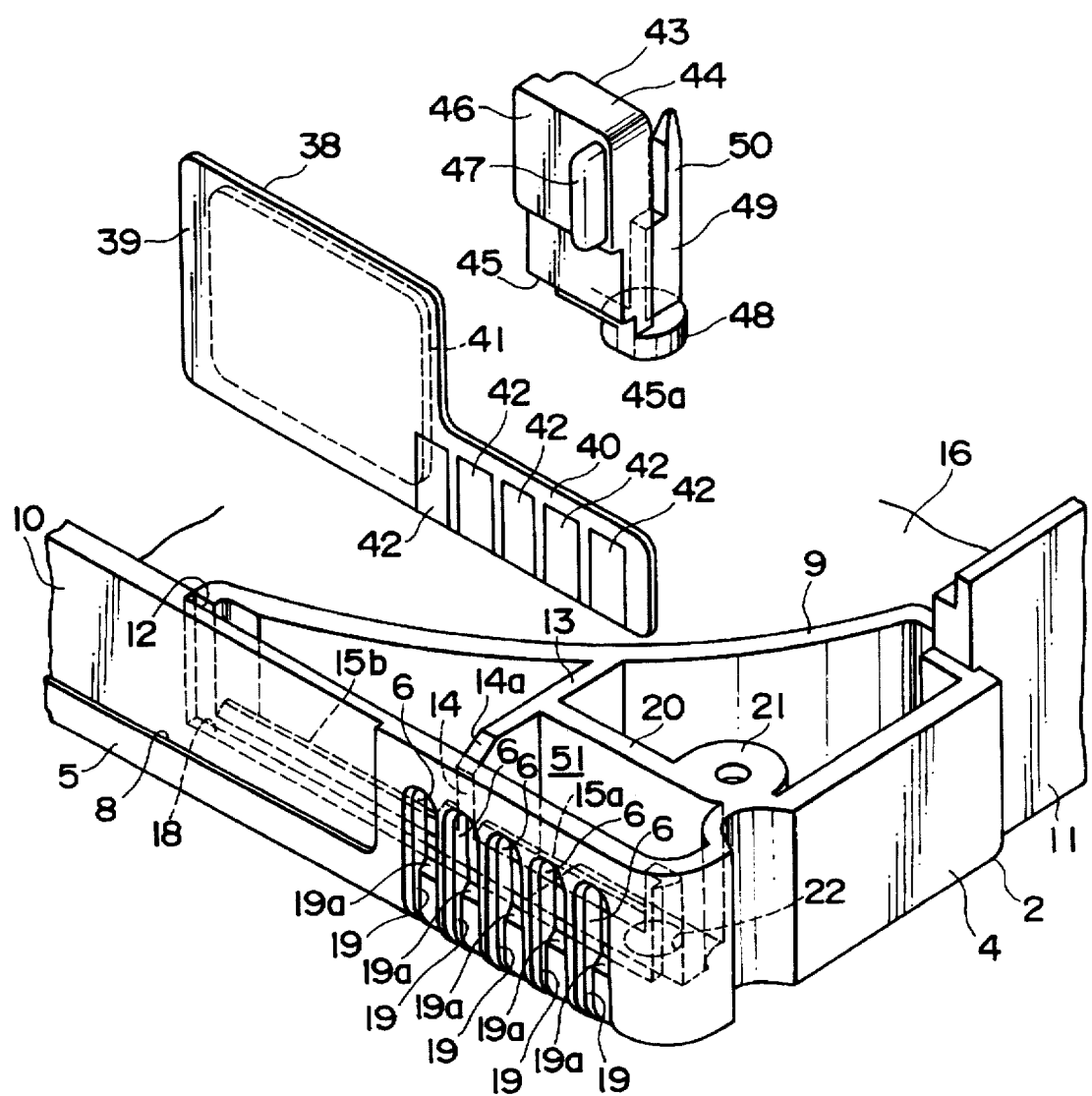
FIG. 2 is an enlarged partial exploded perspective view of the large-size cassette of FIG. 1.
Figure 3:
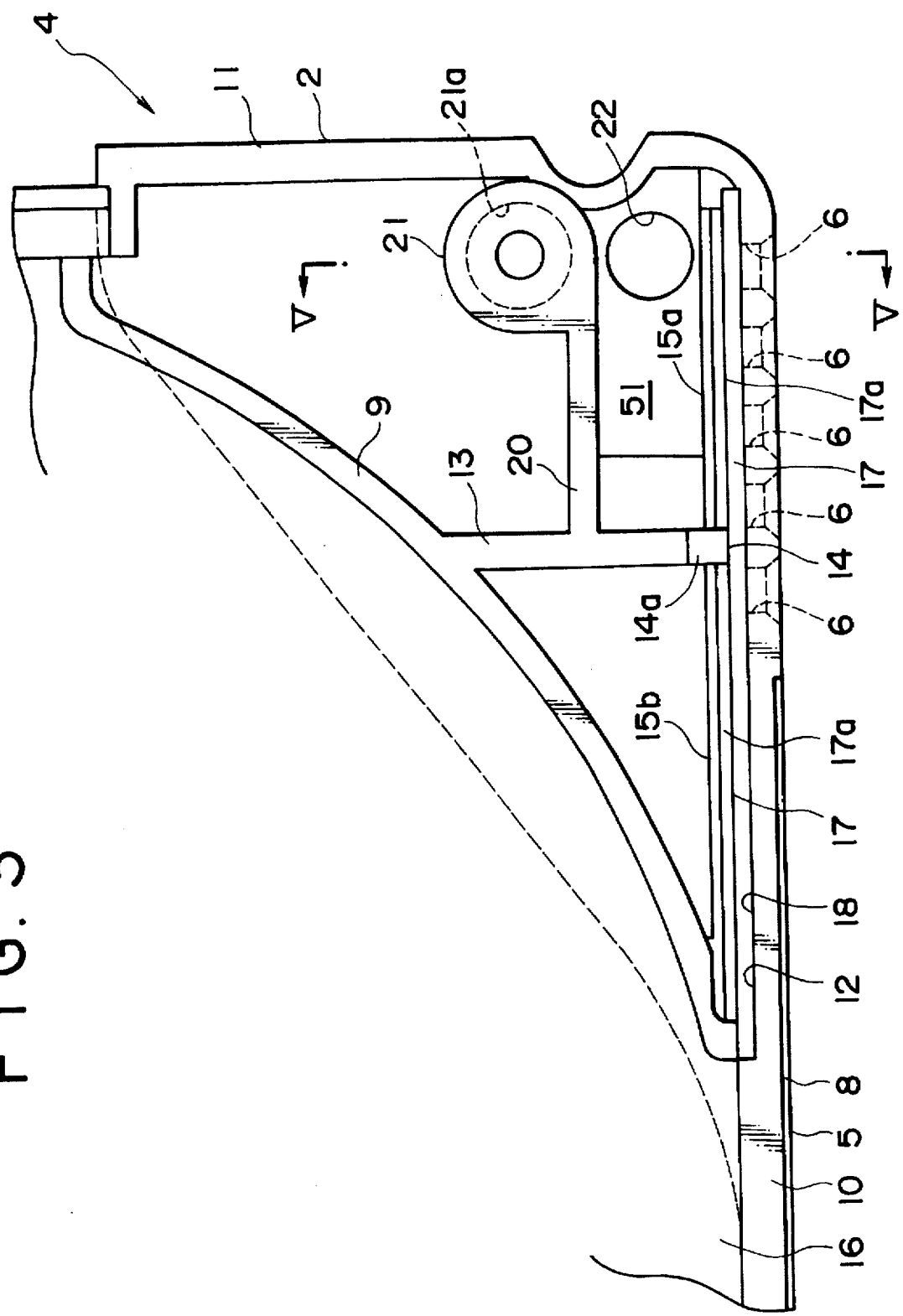
FIG. 3 is an enlarged partial top view of a lower half of a cassette case of the large-size cassette of FIG. 1.
Figure 4:
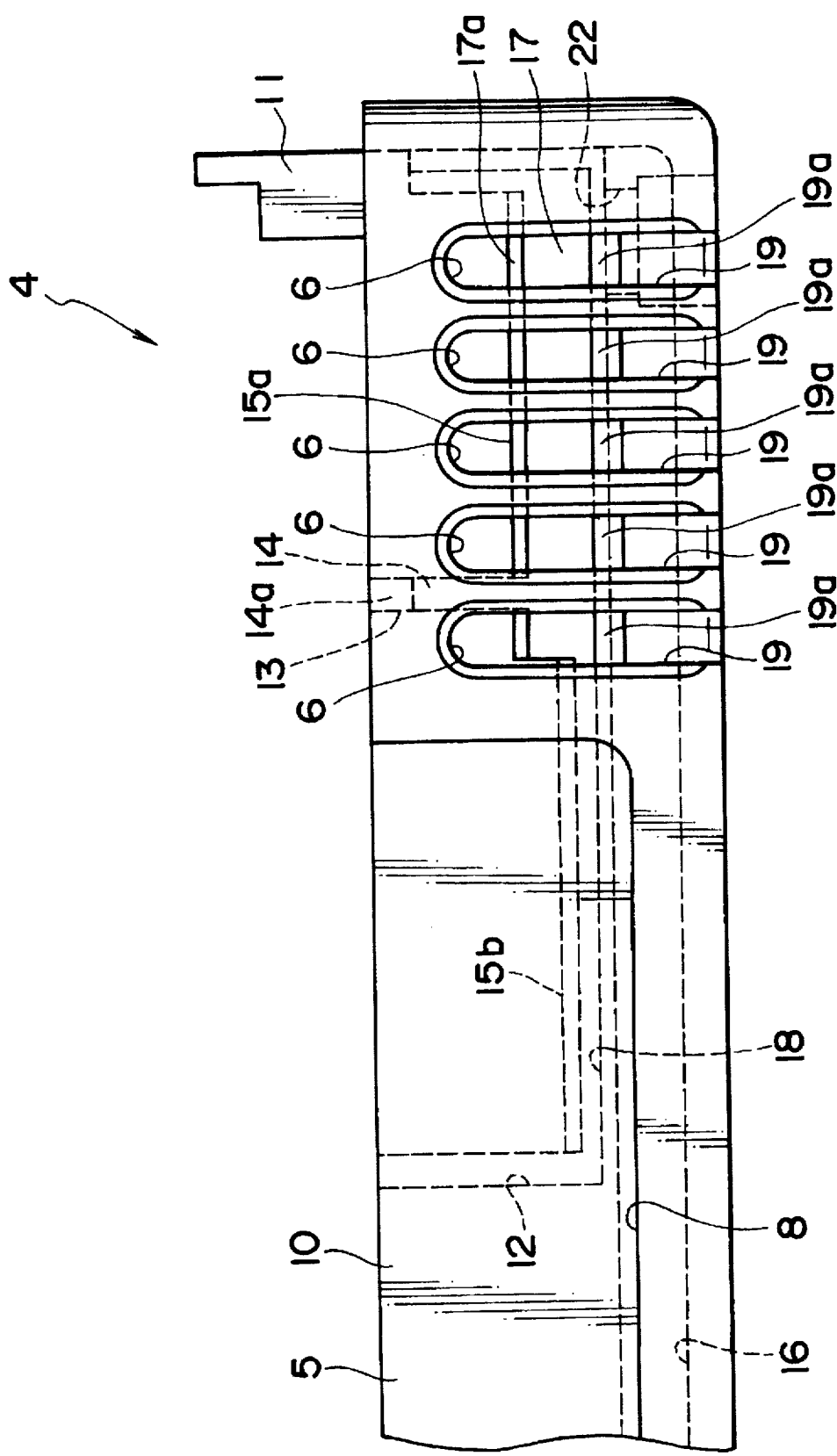
FIG. 4 is an enlarged partial back view of the lower half of the cassette case of the large-size cassette of FIG. 1.

Referring now to FIG. 2, the cassette 1 includes a support plate 38 having an integrated circuit (IC) mount 39 and a terminal mount 40. The IC mount 39 preferably has a somewhat horizontally elongated, rectangular shape. The terminal mount 40 preferably has a horizontally elongated, rectangular shape having a width which is approximately half that of the IC mount 39 and a length approximately the same or slightly shorter than that of the IC mount. Such terminal mount 40 extends to the right from the right lower half of the IC mount 39.

As shown for example in FIG. 2, an IC chip 41 is mounted on the front surface of the IC mount 39. Information including that to be transferred to the recording/reproducing apparatus 201 (FIG. 22) upon the proper installation of the cassette therein as hereinafter described may be stored in the IC chip 41. Such stored information may include information relating to the recording medium, the cassette, and so forth. A plurality of vertically elongated rectangular terminals 42 are arranged on the back surface of the terminal mount 40 from the right end to the left end thereof. The terminals 42 are electrically connected to the IC chip 41.

The support plate 38 is fitted in the right rear portion of the cassette 1, as shown for example in FIGS. 2 and 21. That is, the lower edge of the support plate 38 is fitted in the groove 18 formed in the lower half 4. When the upper and lower halves 3 and 4 are joined together, the upper edge of the IC mount 39 and/or the support plate 38 is fitted in the groove 32 formed in the upper half 3. As a result, the support plate 38 is held in the rear right portion within the case 2. In such situation, the terminals 42 arranged on the support plate 38 are accessible from outside the cassette 1 through the slots 6 formed in the back wall 10 of the lower half case 4.

As shown in FIG. 2, the cassette 1 further includes an erase protect member 43, which may be formed from an elastic synthetic resin or similar such material. Such erase protect member 43 has a main part 44, which may have a shape of a vertically elongated, rectangular plate.

As shown, for example, in FIGS. 2, 11, 16, 17 and 21, the main part 44 includes a step 45 formed along the width of a lower portion of the back surface of the main part. Protruding from approximately the upper half of the main part 44 in the backward direction is an indicating part 46. A knob 47, which may have a rib shape and which extends in a substantially vertical direction, is formed in the right end of the back surface of the indicating part 46. The color of the back surface of the indicating part 46 is preferably an easily noticeable color, such as red.

The erase protect member 43 further includes a disk-shaped shutter 48 formed so as to project toward the front from the right lower end of the main part 44. The erase protect member 43 still further includes a rib 49 which rises from the upper surface of the shutter 48 and has a length approximately half that of the main part 44, as shown in FIGS. 2 and 17.

Figure 11:
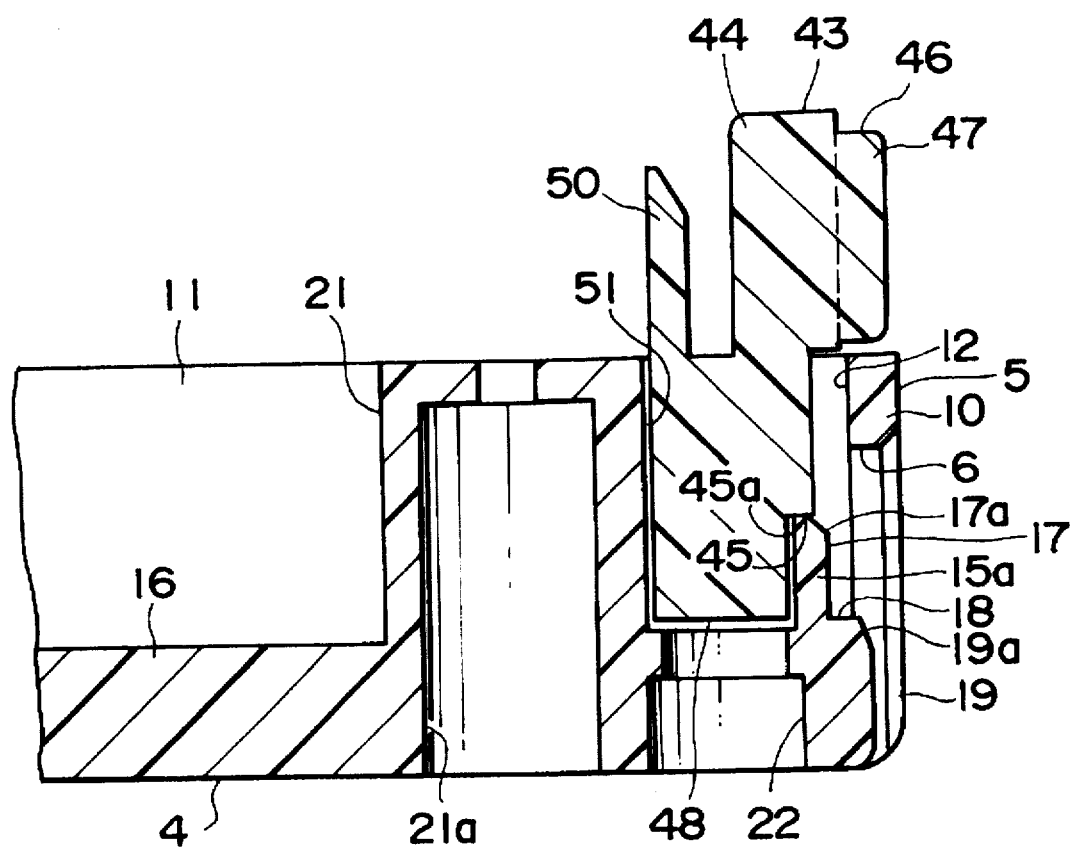
FIG. 11 is a cross-sectional view along a line XI—XI shown in FIG. 9.
Figure 17:
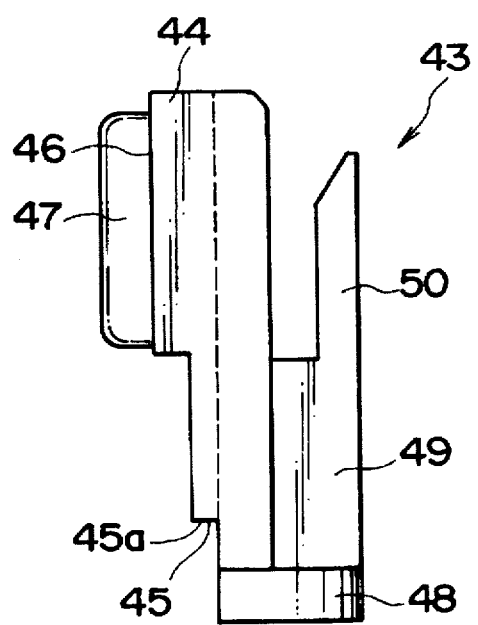
FIG. 17 is an enlarged right side view of the erase protect member.

A click 50 projects upwardly from a front portion of the upper surface of the rib 49, as shown in FIGS. 2, 11 and 17. As viewed from above the click 50, as for example in FIG. 15, the rear surface of the click may have a convex, circular cross section.

The erase protect member 43 is mounted in the case 2 in the following manner.

The lower half of the erase protect member 43, that is, the portion below the indicating part 46, is placed in a space 51 (see, for example, FIGS. 2, 11 and 20), which is defined by the back wall 10, the right side wall 11, the intermediate wall 13 and the limiting wall 20 of the lower half 4. As a result and as shown in FIG. 11, an upper surface 45a of the step 45 of the erase protect member 43 is placed on an upper edge of the holding wall 15a of the lower half 4.

The knob 47 is placed in the erase protect window 7. The upper half 3 is then joined to the lower half 4, such that the limiting wall 33 of the upper half 3 is inserted in the space between the upper half of the erase protect member 43 and the click 50, as shown in FIG. 21. As a result, the limiting wall 33 is adjacent to or in contact with the front surface of the upper half of the main part 44 and, accordingly functions to restrain forward movement of the erase protect member 43.

As a result, the erase protect member 43 is held within the cassette case 2 and can be moved freely by an operator from the left to the right or visa-versa within the space 51.

Figure 18:
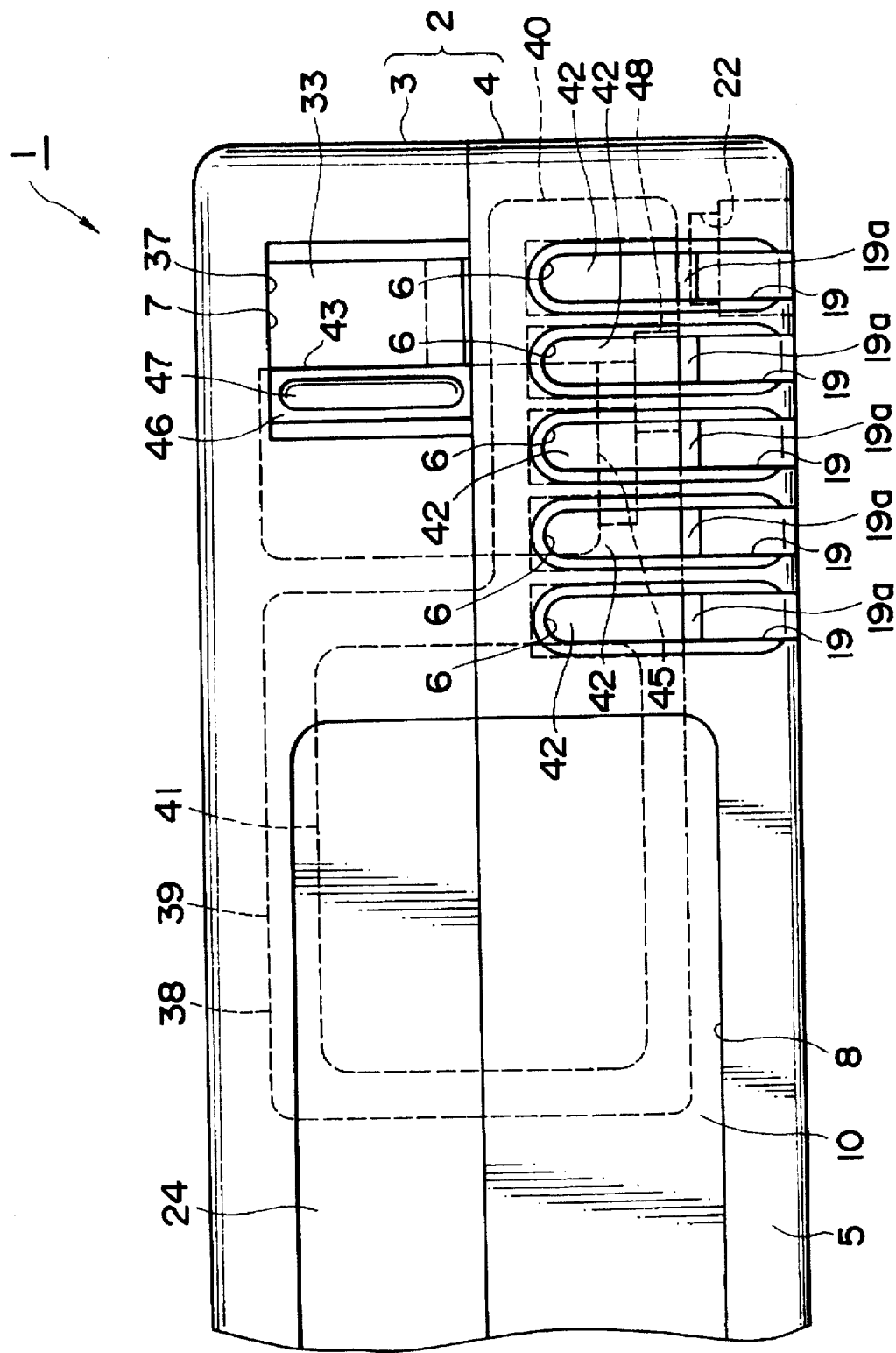
FIG. 18 is an enlarged partial back view of the large-size cassette of FIG. 1 illustrating the erase protect member in a recording-enable position.
Figure 19:
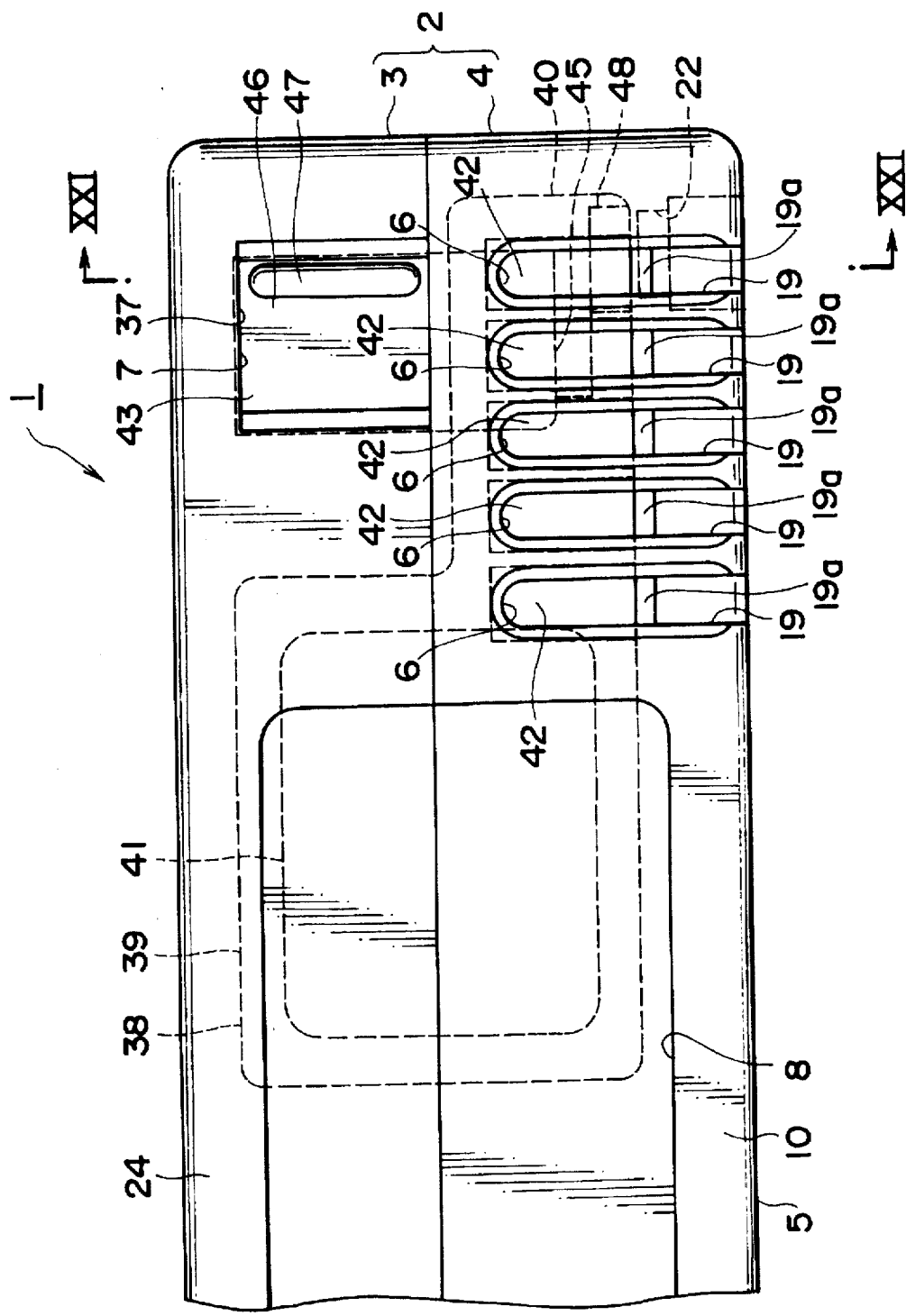
FIG. 19 is an enlarged partial back view of the large-size cassette of FIG. 1 illustrating the erase protect member in a recording-inhibit position.
Figure 20:
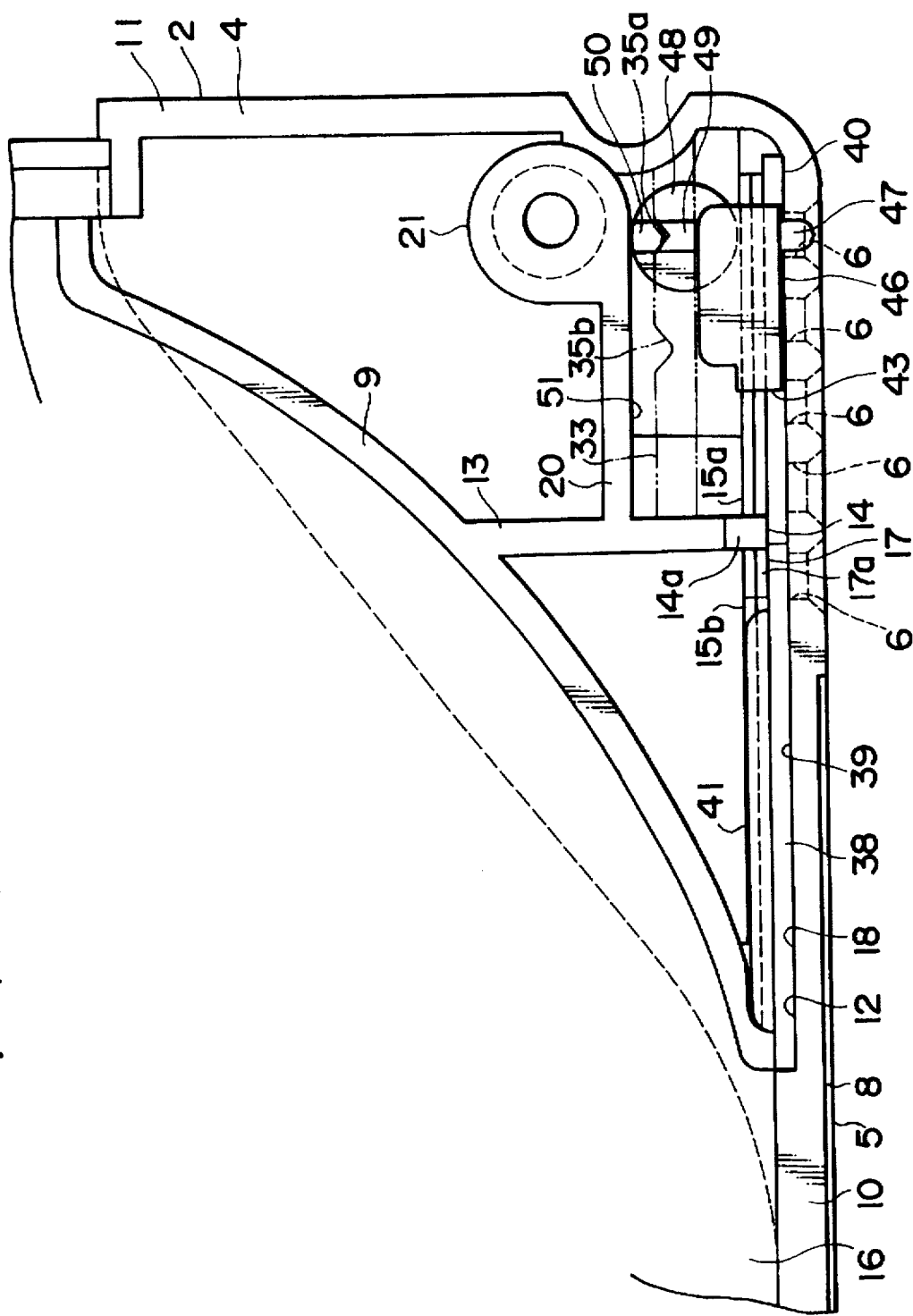
FIG. 20 is an enlarged partial top view of the large-size cassette of FIG. 19 with the upper half of the cassette case removed.

Thus, the erase protect member 43 is able to be moved in a right-left direction within a range defined by the space 51. The left end of this range corresponds to a recording or write enable position, and the right end thereof corresponds to a recording or write inhibit position. When the erase protect member 43 is positioned at the left end of the range (i.e., when the member 43 is in the write-enable position), the shutter 48 is away from the erase protect hole 22 so as to open the erase protect hole 22. The location of the erase protect member 43, and in particular the knob 47, when the member 43 is in such write enable position is illustrated in FIG. 18. On the other hand, when the erase protect member 43 is positioned at the right end of the range (i.e., when the member 43 is in the write inhibit position), the shutter 48 is positioned on the erase protect hole 22 so as to close the erase protect hole 22. The location of the erase protect member 43, and in particular the knob 47, when the member 43 is in such write inhibit position is illustrated in FIG. 19.

The opened and closed positions of the erase protect hole 22 may be detected by use of an erase protect detecting switch 58 (FIG. 22) or other such device in the recording/reproducing apparatus 201 (FIG. 22) in which the cassette 1 is inserted, as hereinafter more fully described. As a result of such detection, data may either be recorded on the magnetic tape within the cassette case 1 or is inhibited from such recording.

When the erase protect member 43 is in the recording inhibit position, the click 50 is set in the right-hand click notch 35a. On the other hand, when the erase protect member 43 is in the recording enable position, the click 50 is set or drops in the left-hand click notch 35b. As a result, such arrangement and the use of the click 50 and the click notches 35a and 35b provide an indication to an operator of the desired one of the positions and retains the erase protect member 43 thereat.

Thus, the erase protect member 43 permits the operator to determine, at a glance (for example, by observing the location of the knob 47) whether or not data can be recorded onto the tape in the cassette.

When the erase protect member 43 is moved from the recording inhibit position to the recording enable position or visa-versa, the force applied to or driving the erase protect member 43 may cause the click 50 to be flexed or bent so as to come out of the respective click notch 35a or 35b.

The recording/reproducing apparatus 201 for use with the cassette 1 will now be described with reference to FIG. 22.

As shown in FIG. 22, the recording/reproducing apparatus 201 includes a connector 52 having a plurality of contact electrodes 53 each adapted to contact a respective one of the terminals 42 of the tape cassette 1. In the interest of clarity, only one connector electrode 53 is shown in FIG. 22.

Each of the contact electrodes 53 may be formed by bending a spring-like wire, or similar such material, having a desired conductivity. Each contact electrode 53 has one end fixed to a case 54 and the other end, that is, a free end, bent in a V-shape so as to form a contact part 55 having a bend 55a. The bends 55a of the contact parts 55 protrude from the front wall of the case 54.

The connector 52 is positioned on a movable plate 56 which, in turn, is arranged within the recording/reproducing apparatus 201 as shown in FIG. 22. The movable plate 56 is adapted to be moved by a movement mechanism 199 (FIGS. 29 and 30) of the recording/reproducing apparatus 210 to one of a plurality of positions which corresponds to the size of the respective tape cassette inserted into the recording/reproducing apparatus.

When the large-size tape cassette 1 is inserted into the recording/reproducing apparatus 201, the movable plate 56 is moved to a position corresponding to the large-size tape cassette 1. During such insertion, the large-size cassette 1 is moved in a downward direction and positioned on a cassette mounting surface 203 as shown in FIG. 22. As a result, the bends 55a of the contact parts 55 of the contact electrodes 53 are guided through the guide grooves 19 of the cassette case 2 so as to extend through the slots 6 and respectively contact the terminals 42 of the support plate 38. Thereafter, information stored in the IC chip 41 (such as that previously described) may be read by a read unit (not shown) of the recording/reproducing apparatus 201 connected to one or more of the contact electrodes 53. Such read information may be utilized by the recording/reproducing apparatus 201 so as to operate in the desired manner.

The recording/reproducing apparatus 201 further includes a positioning pin 57 which is arranged in a substantially upright position on the movable plate 56 as shown in FIG. 22. When the large-size tape cassette 1 is mounted on the cassette mounting surface 203 in a manner as previously described, the positioning pin 57 enters the reference hole 21a so as to accurately position the large-size tape cassette 1 in the recording/reproducing apparatus 201.

The recording/reproducing apparatus 201 still further includes the erase protect detecting switch 58 which is arranged on the movable plate 56 as shown in FIG. 22. The erase protect detecting switch 58 includes a case 60 and an erase protect detecting pin 59. The erase protect detecting pin 59 is supported on the case 60 and is adapted to move in a vertical direction. More specifically, the erase protect detecting pin 59 is biased upward by a resilient device (not shown), such as a spring-type device, so as to cause the erase protect detecting pin to project upward from the case 60 in the absence of a downward force which exceeds the upward directed force exerted on the erase protect detecting pin by the resilient device. However, when such downward force is exerted on the erase protect detecting pin 59, such pin may be depressed or moved in a downward direction.

Figure 23:
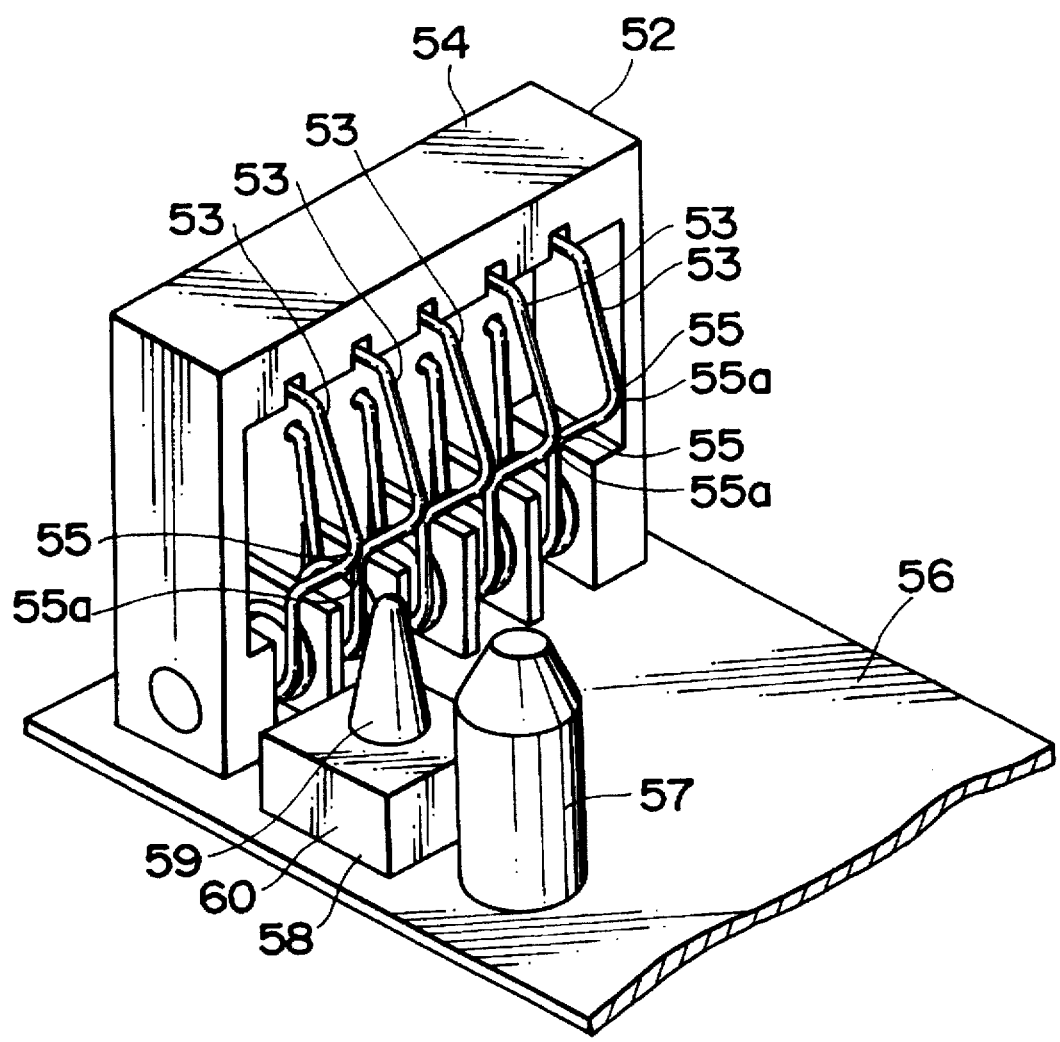
FIG. 23 is a partial enlarged perspective view of a portion of the recording/reproducing apparatus illustrating a positioning member.
Figure 24:
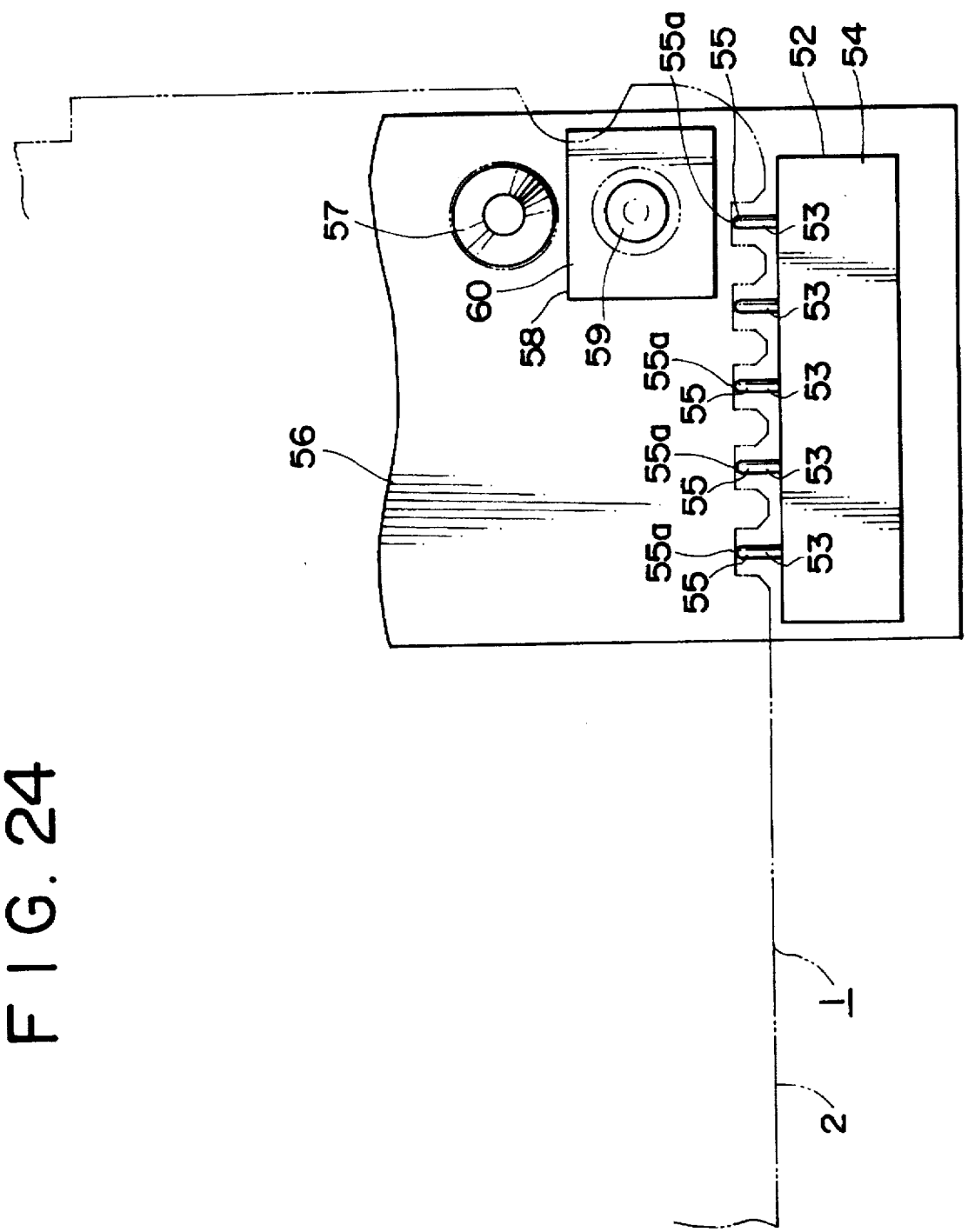
FIG. 24 is a partial top view of the portion of the recording/reproducing apparatus of FIG. 23.

FIGS. 23 and 24 further illustrate the movable plate 56 with the connector 52, the positioning pin 57 and the erase protect detecting switch 58. That is, FIGS. 23 and 24 respectively illustrate a partial perspective view and a top view of such portion of the movable plate 56.

Thus, when the large-size tape cassette 1 is mounted on the cassette mounting surface 203 of the recording/reproducing apparatus 201, the positioning pin 57 enters the reference hole 21a so as to properly position the large-size tape cassette. As a result, the terminals 42 of the large-size tape cassette 1 respectively contact the contact electrodes 53 of the connector 52 and the erase protect hole 22 of the large-size tape cassette is positioned so as to be aligned with or opposite to the erase protect detecting pin 59 of the erase protect detecting switch 58. As a result, the erase protect detecting pin 59 is depressed when the tape cassette 1 is in the recording inhibit state and is fully projected from the case 60 when the tape cassette 1 is in the recording enable state.

Figure 25A:
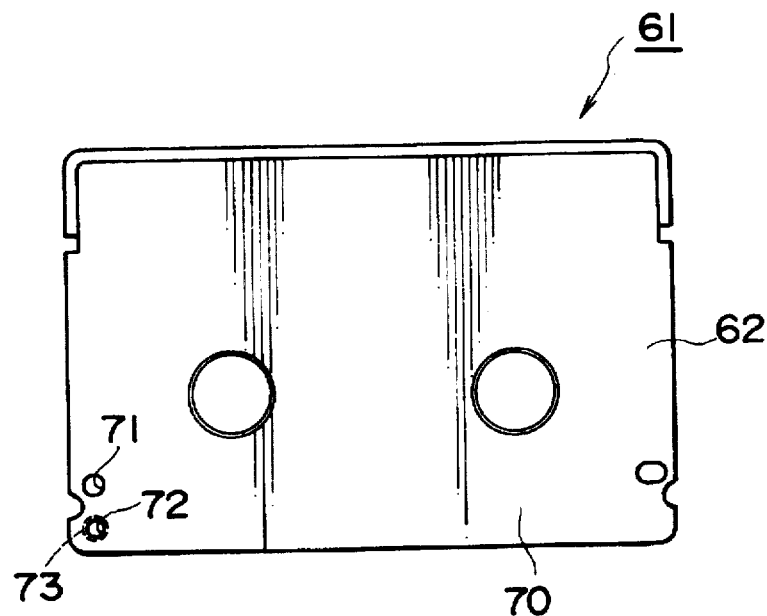
FIGS. 25(a) and 25(b) are bottom views of a small-size cassette in accordance with an embodiment of the present invention and the large-size cassette of FIG. 1, respectively, in the same scale.
Figure 26A:
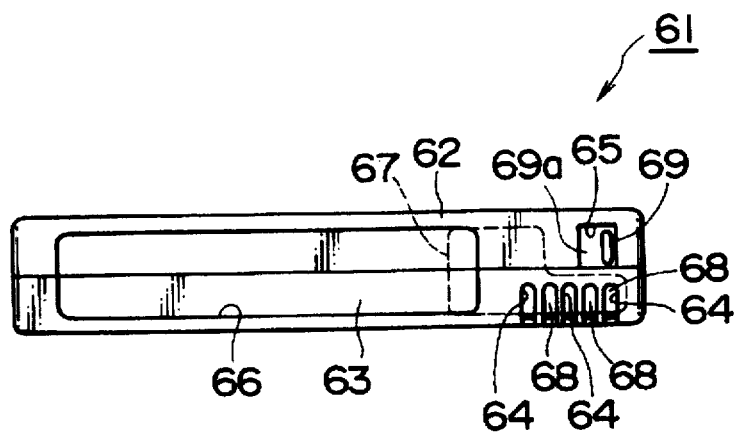
FIGS. 26(a) and 26(b) are back views of the small-size cassette of FIG. 25a and the large-size cassette of FIG. 1, respectively, in the same scale.

A small-size cassette 61 is illustrated in FIGS. 25a and 26a. The small-size cassette 61, like the large-size cassette, may include a magnetic tape therein and accordingly will be referred to as a small-size tape cassette. Such small-size tape cassette differs primarily in size from the large-size tape cassette 1 and is otherwise substantially the same as the large-size tape cassette 1. As a result, in the following description of the small-size tape cassette 61, only the bottom surface and the back surface thereof and several components or members associated therewith will be described. However, the other components or members which are not described herein are similar to those of the large-size tape cassette 1.

As shown in FIG. 25a, the small-size tape cassette 61 includes a cassette case 62. The cassette case 62 includes a bottom wall 70 having a reference hole 71 and an accidental erasure protection or erase protect hole 72 formed therein.

As shown in FIG. 26a, the cassette case 62 has a back wall 63 which includes a plurality of slots 64 and an erase protect window 65 formed in the right side thereof. Most of the remainder of the back wall 63 is utilized as a cassette labeling area 66. An indicating part 69a of an erase protect member 69, which is movably supported within the cassette case 62, is positioned in the erase protect window 65. The erase protect member 69 includes a shutter 73 (FIG. 25a) which may be moved relative to the cassette case 62 such that the shutter may be moved away from the erase protect hole 72 thereby opening the erase protect hole or may be moved to cover the erase protect hole thereby closing the same.

As further shown in FIG. 26a, a plurality of terminals 68 are arranged on a support plate 67 which is located within the cassette case 62. Such terminals 68 are accessible from outside the cassette 61 through the slots 64.

The components or members of the small-size tape cassette 61 described above, such as, the slots 64, the erase protect window 65, the support plate 67, the terminals 68 and the erase protect member 69, with the exception of the above description, are otherwise similar to the corresponding components of the large-size tape cassette 1 and, accordingly further description thereof is omitted herein.

Figure 25B:
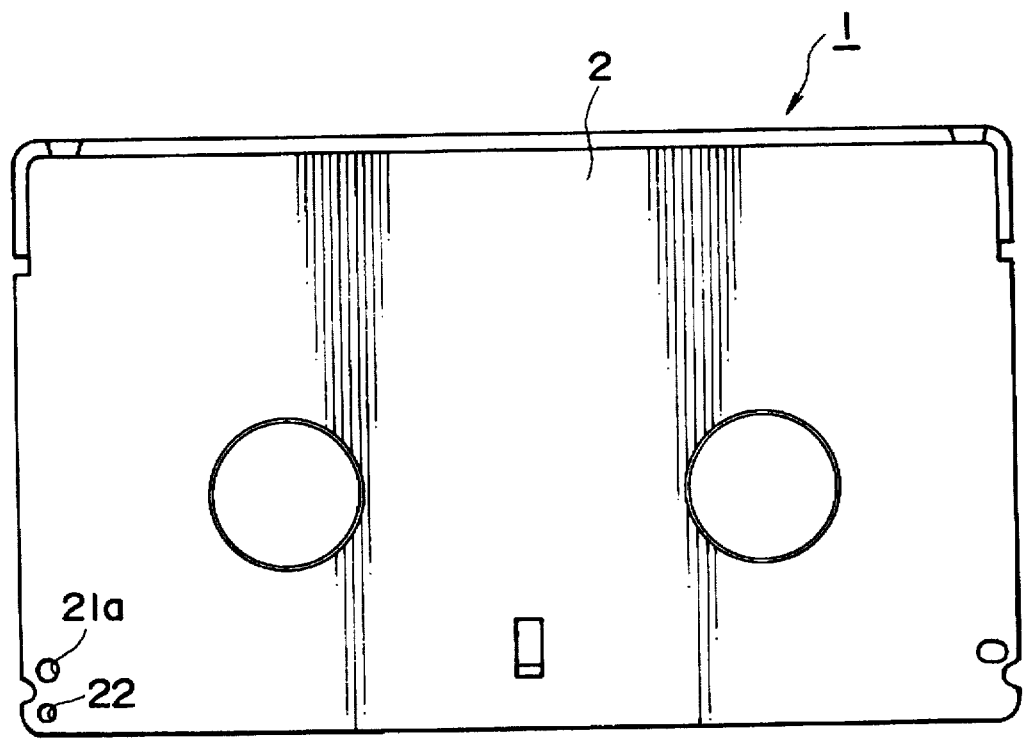
Figure 26B:
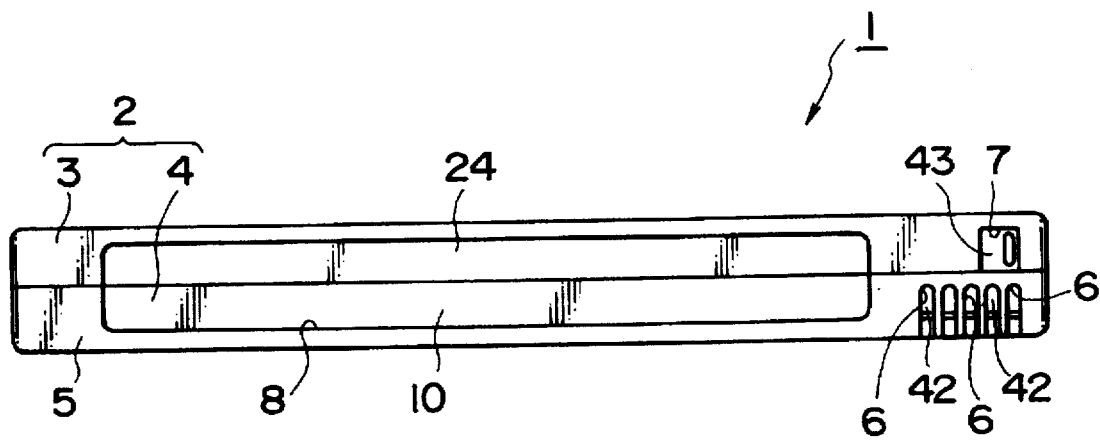

FIGS. 25b and 26b respectively illustrate bottom and back views of the large-size tape cassette 1 which are presented in substantially the same scale as the corresponding views of the small-size tape cassette 61 of FIGS. 25a and 25b.

The positional relation between the reference hole 71 and the erase protect hole 72 of the small-size tape cassette 61 is the same as that between the reference hole 21a and the erase protect hole 22 of the large-size tape cassette 1. Further, the positional relation between the reference hole 71 and the slots 64 is the same as that between the reference hole 21a and the slots 6 of the large-size tape cassette 1.

As a result of the above-described relations, the small-size tape cassette 61 may be utilized with the recording/reproducing apparatus 201 (FIG. 22). More specifically, when the small-size tape cassette 61 is inserted in the recording/reproducing apparatus 201, the movable plate 56 moves to the position corresponding to the small-size tape cassette, and the positioning pin 57 enters the reference hole 71 so as to properly position the smaller tape cassette on the cassette mounting surface 203 of the recording/reproducing apparatus. Consequently, the terminals 68 of the small-size tape cassette 61 contact the contact electrodes 53 of the connector 52, and the erase protect hole 72 is aligned with the erase protect detecting pin 59 of the erase protect detecting switch 58.

Figure 27A:
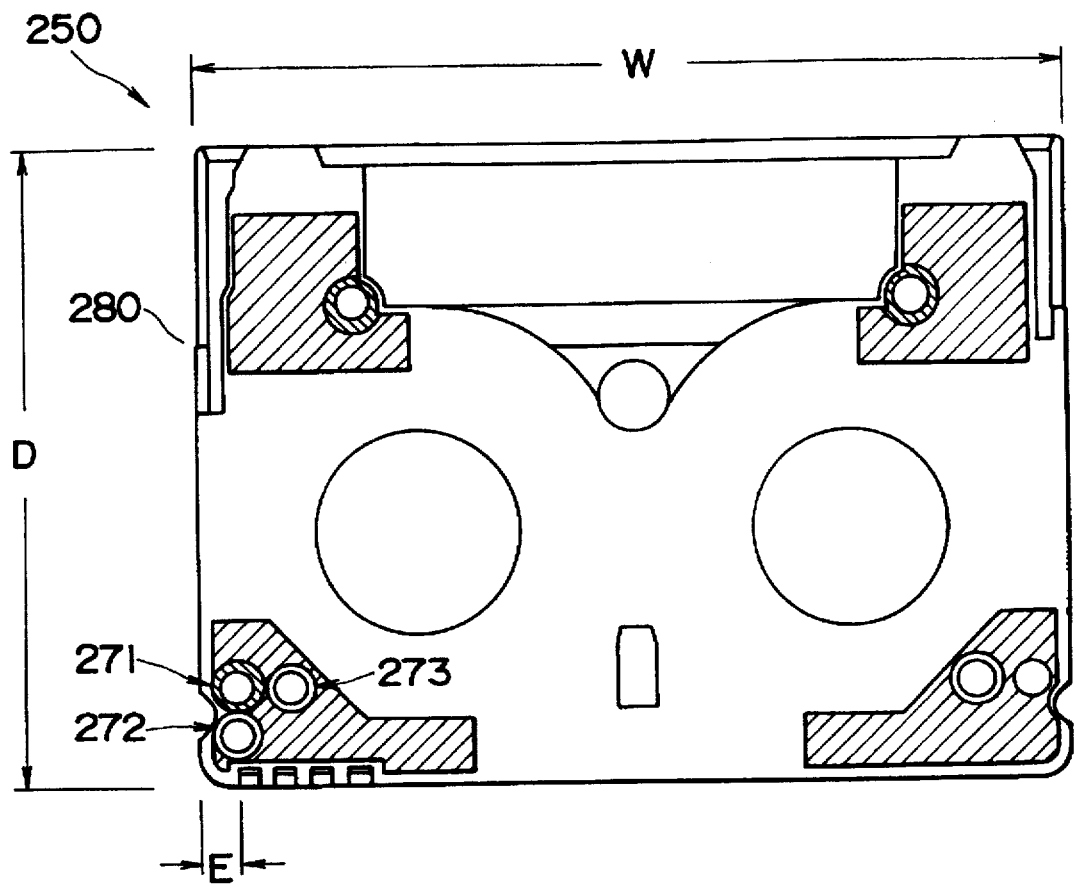
Figure 27B:
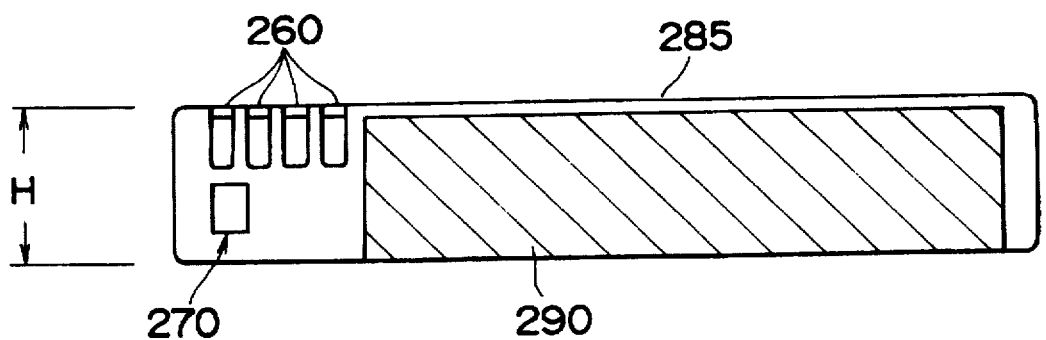
FIG. 27B is a back view of the small-size cassette of FIG. 27A.
Figure 27C:
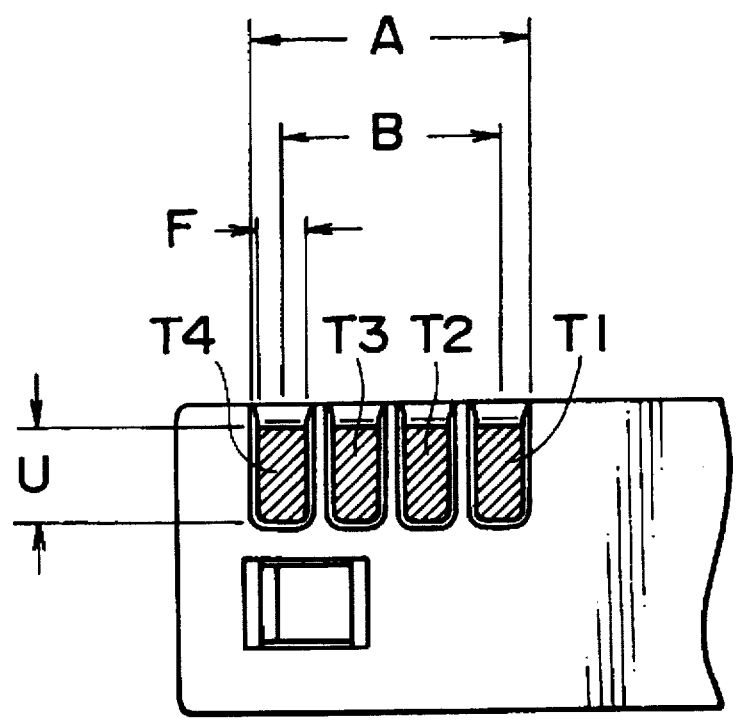
FIG. 27C is a partial back view of the small-size cassette of FIG. 27A.
Figure 28A:
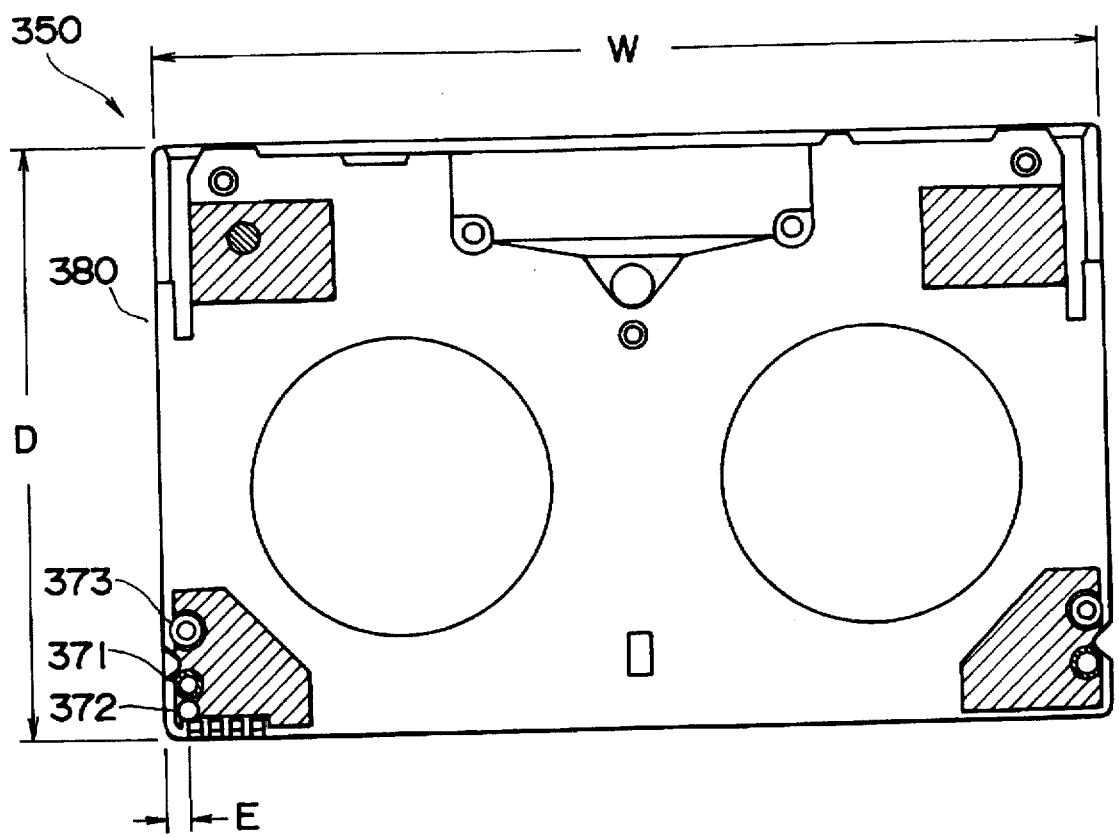
FIG. 28A is a bottom view of a large-size cassette having a recording medium in accordance with a modification to the large-size cassette of FIG. 1.
Figure 28B:
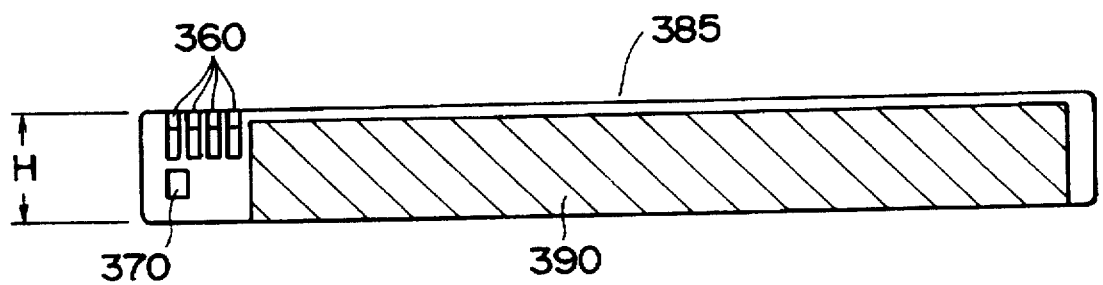
FIG. 28B is a back view of the large-size cassette of FIG. 28A.
Figure 28C:
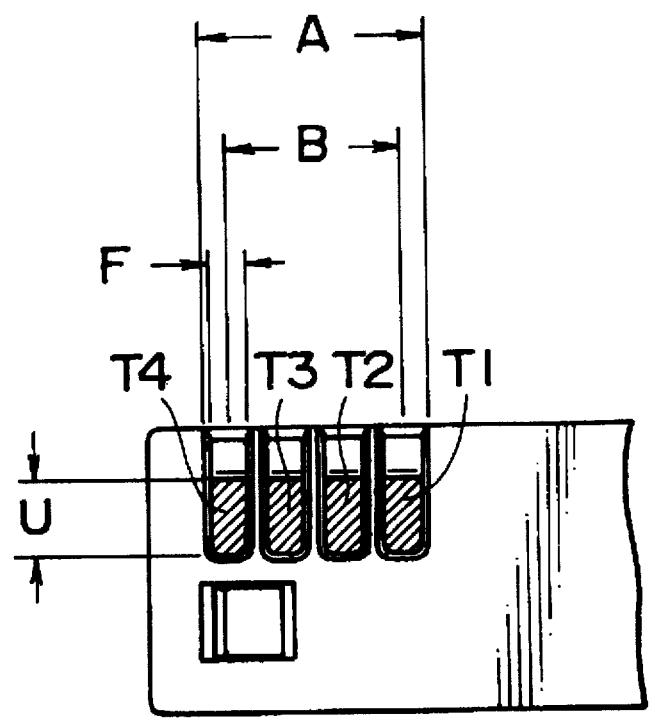
FIG. 28C is a partial back view of the large-size cassette of FIG. 28A.

FIGS. 27 and 28 illustrate two other embodiments of the present tape cassettes. That is, FIGS. 27A, 27B and 27C illustrate a bottom view, a back view and a partial back view of a small-size cassette 250, whereas FIGS. 28A, 28B and 28C illustrate a bottom view, a back view and a partial back view of a large-size cassette 350.

As shown in FIGS. 27A, the small-size cassette 250 includes a bottom wall 280 having a reference hole 271, an erase protect hole 272 and a recognition hole 273. As is to be appreciated, the reference hole 271 and the erase protect hole 272 correspond to the reference and erase protect holes of the cassettes 1 and 61 and, as such, will not be further described herein. The recognition hole is adapted to provide information to the recording/reproducing apparatus 201 by use of a detecting device (such as detection device 171 of FIGS. 29 and 30) after the insertion of the cassette therein. Such information may relate to the recording tape contained within the cassette 250, such as, the thickness of the tape, the material of the tape and so forth.

As shown in FIGS. 27 B and C, the small-size cassette 250 has a back wall 285 having a plurality of slots 260, such as four slots, an erase protect window 270 and a labelling area 290. The slots 260, the erase protect window 270 and the labelling area 290 correspond to those of the cassettes 1 and 61 and, accordingly will not be further described herein. As with the cassettes 1 and 61, labels may be attached to the cassette 250 in the labelling area 290, but normally not outside this area.

Similarly, as shown in FIG. 28A, the large-size cassette 350 has a bottom wall 380 having a reference hole 371, an erase protect hole 372 and a recognition hole 373; and as shown in FIGS. 28 B and C, the cassette 350 has a back wall 385 having a plurality of slots 360, such as four slots, an erase protect window 370 and a labelling area 390.

As with the cassettes 1 and 61, the positional relation between the reference hole 271 and the erase protect hole 272 of the small-size tape cassette 250 is the same as that between the reference hole 371 and the erase protect hole 372 of the large-size tape cassette 350; and the positional relation between the reference hole 271 and the slots 260 is the same as that between the reference hole 371 and the slots 360 of the large-size tape cassette 350.

The tape cassettes 250 and 350 illustrated in FIGS. 27 and 28, respectively, may have the following dimensions:

| Tape cassette | Small Cassette 250 | Large Cassette 350 |
|---|---|---|
| Height (H) | 12.2 | 14.6 |
| Depth (D) | 48.0 | 78.0 |
| Width (W) | 66.0 | 125.0 |
| Length of contact area (A) | 10.8 | 10.8 |
| Length of contacts (B) center line to center line | 8.4 | 8.4 |
| Contact depth (C) | 3.8 | 3.8 |
| Contact width (F) | 1.8 | 1.8 |
| Length between side wall and edge of contact (E) | 3.0 | 3.0 |

The cross-hatched areas of the bottom walls 280 and 380 of the cassettes 250 and 350 of FIGS. 27A and 28A, respectively, indicate datum areas or planes which may be utilized.

Each of the cassettes 250 and 350 includes terminals, such as terminals T1–T4 which are respectively associated with the slots as in cassettes 1 and 61. Such terminals may provide cassette identification and/or information, such as tape thickness, tape type and tape grade and so forth, by having a respective resistance value between each contact and ground (which may be terminal or contact T4) which corresponds to such identification or information. Such resistance values, which correspond to the identification and/or information, may be detected by a video cassette recorder (VCR), such as the recording/reproducing apparatus 201 (FIG. 22).

With the exception of the above description, the cassettes 250 and 350 are substantially similar to cassettes 1 and 61 and, as such, include similar components or members. Accordingly, a further description of such components or members is omitted herein in the interest of brevity.

Figure 29:
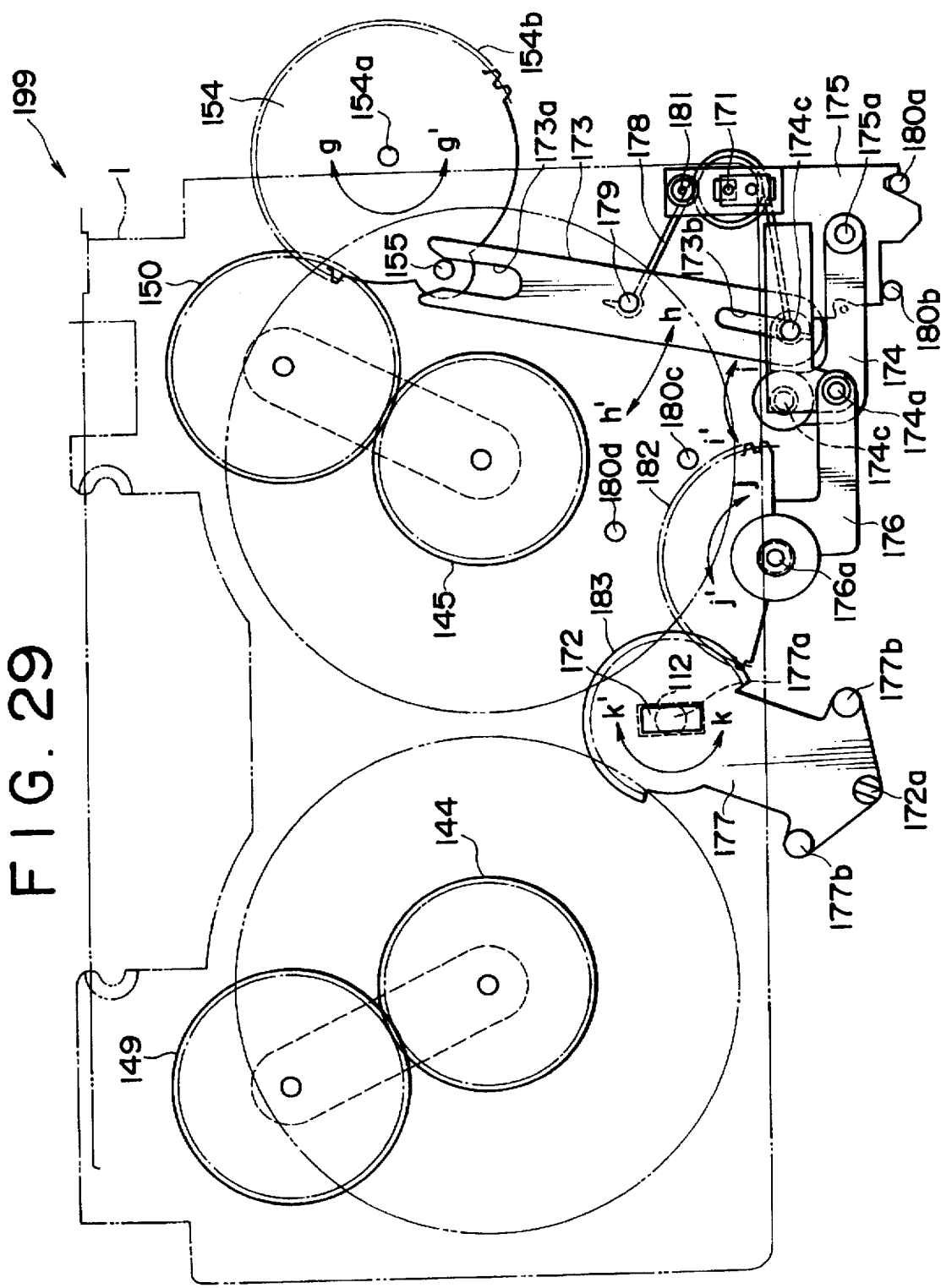
FIG. 29 is a top view of a large-size cassette engaged in a cassette information detection device and a reel lock release device.
Figure 30:
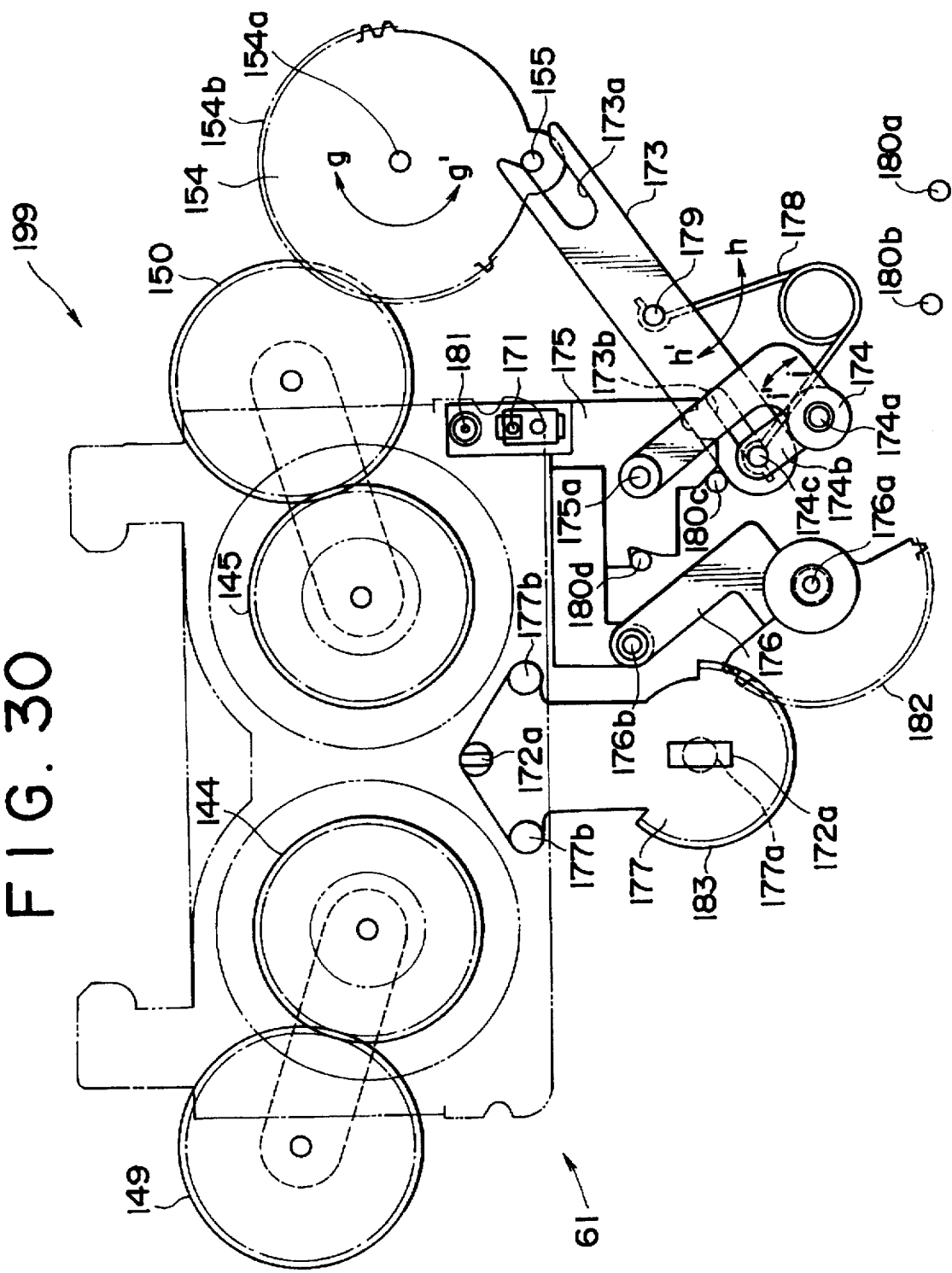
FIG. 30 is a top view of a small-size cassette engaged in the cassette information detection device and the reel lock release device.

FIGS. 29 and 30 illustrate a movement mechanism 199 for a tape cassette information detecting device 171 and a reel lock release device 172a of the recording/reproducing apparatus 201. In particular, FIG. 29 illustrates the arrangement of such movement mechanism and devices when a large-size cassette such as the cassette 1 is installed into the recording/reproducing apparatus 201; whereas FIG. 30 illustrates such arrangement when a small-size cassette such as the cassette 61 is installed into the recording/reproducing apparatus 201.

The movement mechanism 199 generally includes a moving lever 173, a drive link 174, a detecting mechanism support member 175, a connected drive link 176, a reel lock release plate 177 and a toggle spring 178.

The moving lever 173 is rotatably supported about a fulcrum axis 179 on a main chassis (not shown) in the direction of h–h'. A slit 173a disposed in one end of the moving lever 173 engages a driver pin 155 which moves in synchronism with the movement of a pair of reel bases 144, 145 which, in turn, are respectively coupled to members 149 and 150. The driver pin 155 is coupled to a member 154 which, in turn, is coupled to or includes a gear-like member 154b. The members 154 and 154b are rotatably coupled to the main chassis by a pin 154a. At least one of the members 154 and 154b is coupled to the member 150. The moving lever 173 further includes a long hole 173b formed in the other end thereof.

The drive link or lever 174 is formed in an L-shape. An end of the drive lever 174 is rotatably supported around a fulcrum axis 174a disposed on the main chassis in the direction indicated by the arrow i–i'. Further, the drive lever 174 is coupled to the long hole 173b in the moving lever 173 by way of a sub-link 174b which is coupled thereto by a pin 174c disposed in the fulcrum axis side of the sub-link. The other end of the drive link 174 is coupled to the detecting mechanism support member 175 at an axis 175a.

The toggle spring 178 engages the fulcrum axis 179 of the moving lever 173 and the pin 174c in the sub-link 174b of the drive link 174. The toggle spring 178 is biased to open the moving link and the sub-link. The toggle spring 178 is adapted to cause the moving lever 173 to toggle, that is, to rotate in the direction indicated by the arrow "i—i".

The detecting mechanism support member 175 is moved by the drive link 174 and the drive link 176 (note the movement change between the FIGS. 29 and 30). The toggle spring 178 is adapted to transmit the drive power or force received by the drive link 174 to the drive link 176 as the toggle spring 178 moves.

As shown in FIG. 29, the large-size cassette 1 is supported on the detecting mechanism supporting member 175 which is located by a pair of stoppers 180a, 180b. Similarly, as shown in FIG. 30, the small-size cassette 61 is supported on the detecting mechanism supporting member 175 which is located by a pair of stoppers 180c, 180d.

The mechanical detecting device 171 is disposed on the detecting mechanism supporting member 175. The detecting device 171 is adapted to confirm cassette type, cassette information, detect which of the recognition holes is contacted, and so forth corresponding to the position where the respective cassette is placed. The recording/reproducing apparatus 201 may check or compare the information obtained from the IC chip 41 (FIG. 2) to that obtained by the detecting device 171.

The connector 52 (FIG. 22) is held on the detecting mechanism supporting member 175 and is connected to the terminals of the respective cassette when the cassette is installed within the recording/reproducing apparatus 201.

A base position member 181 is disposed on the detecting mechanism supporting member 175. Such base position member 181 is adapted to position the large and small size cassettes by use of a position member (not shown).

The drive link 176 is rotatably linked about the axis 176a on the main chassis so as to rotate in the direction indicated by the arrow j–j'. One end of the drive link 176 is linked to the detecting mechanism supporting member 175 by a pin 176b and is driven in synchronism with the movement of the reel bases 144, 145.

A fan shaped gear 182 is arranged so as to be coupled to the axis 176a. Such gear 182 engages the reel lock release plate 177. The real lock release plate 177 is rotatably driven about a center portion 177a in the direction indicated by an arrow k–k' by a gear 183 which is disposed on the same axis as the center portion 177a.

The real lock release device 172a for the small-size cassette is disposed on the reel lock release plate 177 and on the axis of the center portion 177a of the reel lock release plate 177. The real lock release device 172a may be released by the insertion of the large cassette into the insertion hole of the recording/reproducing apparatus 201 (not shown). The reel lock release device 172a and a cassette height determination member 177b are moved in the k rotational direction of the reel lock release plate 177 so as avoid a collision with the large-size cassette 1.

An example of the operation of the movement mechanism 199 will now be described for the situation in which the small-size cassette 61 is inserted into the recording/reproducing apparatus 201. In such situation, in moving the pair of reel bases 144, 145 into the position corresponding to that of the small-size cassette, the rotating member 154 rotates in the direction indicated by an arrow "g'", the drive link 174 rotates in the direction indicated by the arrow "i'the drive link 176 rotates in the direction indicated by the arrow "j'" by way of the detecting mechanism support member 175, and the reel lock release plate 177 rotates in the direction indicated by the arrow "k'". During such movement, the pair of reel bases 144, 145 are moved in synchronism with the movement of the small-size cassette 61 in the recording/reproducing apparatus 201.

Reference is made to the below identified four related applications:

(1) Japanese Application No. 04237618 filed on Aug. 14, 1992, which corresponds to U.S. application Ser. No. 08/103,558 filed on Aug. 9, 1993;

(2) Japanese Application No. 04209470 filed Jul. 15, 1992, which corresponds to U.S. application Ser. No. 08/067,811 filed on May 27, 1993;

(3) Japanese Application No. 04336779 filed Nov. 25, 1992, which corresponds to U.S. application Ser. No. 08/151,203 filed Nov. 12, 1993; and (4) Japanese Application No. 05081194 filed Mar. 17, 1993, which corresponds to U.S. application Ser. No. 08/213,633 filed on Mar. 16, 1994.

The above identified four applications are hereby incorporated by reference into the present application.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A first-size cassette having a shape substantially the same as a second-size cassette which is larger than said first-size cassette and in which said first-size and second-size cassettes are insertable into a common cassette recording/reproducing apparatus, said second-size cassette having a second reference hole, a second accidental erasure protection hole and second information means including a second plurality of electric terminals for providing information pertaining to said second-size cassette to said cassette recording/reproducing apparatus when said second-size cassette is inserted into said cassette recording/reproducing apparatus, said first-size cassette comprising:

a cassette case having a plurality of walls and holding a recording medium therein;

first information means for providing information pertaining to said first-size cassette to said cassette recording/reproducing apparatus when said first-size cassette is inserted into said cassette recording/reproducing apparatus, said first information means including electric terminal means having a first plurality of electric terminals each having a width associated therewith which is substantially identical to a width of each electric terminal of a second plurality of electric terminals of said second-size cassette and in which adjacent ones of said first plurality of electric terminals are arranged so as to have a first predetermined distance therebetween which is the same as in said second-size cassette, said first plurality of electric terminals being arranged so as to have a second predetermined distance between said first plurality of electric terminals and an edge of a side wall nearest to said first plurality of electric terminals which is the same as between said second plurality of electric terminals and a corresponding edge in said second-size cassette; and a first reference hole for positioning said cassette case in said cassette recording/reproducing apparatus, wherein said first information means and said first reference hole have the same distance therebetween as between said second information means and said second reference hole of said second-size cassette.

2. A first-size cassette according to claim 1, wherein said first information means further includes a recognition hole which is adapted to provide an indication of at least one feature of said first-size cassette to said cassette recording/reproducing apparatus.

3. A first-size cassette according to claim 1, wherein said cassette case includes upper and lower portions and wherein said terminal means is located on said lower portion of said cassette case.

4. A first-size cassette according to claim 3, further comprising an accidental erasure protection hole located in a bottom wall of said cassette case, said accidental erasure protection hole of said first-size cassette being located at the same position as in said second-size cassette.

5. A first-size cassette according to claim 4, further comprising a movable erase protect member for covering and uncovering said accidental erasure protection hole so as to provide an indication to said cassette recording/reproducing apparatus as to whether signals may be recorded onto said recording medium, said erase protect member having means located in the upper portion of said cassette case for enabling a user to selectively move said erase protect member.

6. A first-size cassette according to claim 5, wherein said first plurality of terminals and said means for enabling are arranged on a back wall of said cassette case such that said means for enabling is located above said first plurality of terminals.

7. A first-size cassette according to claim 1, wherein a back side wall of said cassette case includes a recessed area adapted for adhering a label thereto.

8. A first-size cassette according to claim 7, wherein a distance between a bottom surface of a lower portion of said cassette case and a lower edge of said recessed area is substantially the same as that in said second-size cassette.

9. A first-size cassette having a shape substantially the same as that of a second-size cassette which is smaller than said first-size cassette and in which said first-size and second-size cassettes are insertable into a common cassette recording/reproducing apparatus, said second-size cassette having a second reference hole, a second accidental erasure protection hole and second information means including a second plurality of electric terminals for providing information pertaining to said second-size cassette to said cassette recording/reproducing apparatus when said second-size cassette is inserted into said cassette recording/reproducing apparatus, said first-size cassette comprising:

a cassette case having a plurality of walls and holding a recording medium therein;

first information means for providing information pertaining to said first-size cassette to said cassette recording/ reproducing apparatus when said first-size cassette is inserted into said cassette recording/reproducing apparatus, said first information means including electric terminal means having a first plurality of electric terminals each having a width associated therewith which is substantially identical to a width of each electric terminal of said second plurality of electric terminals of said second-size cassette and in which adjacent ones of said first plurality of electric terminals are arranged so as to have a first predetermined distance therebetween which is the same as in said second-size cassette, said first plurality of electric terminals being arranged so as to have a second predetermined distance between said first plurality of electric terminals and an edge of a side wall nearest to said first plurality of electric terminals which is the same as between said second plurality of electric terminals and a corresponding edge in said second-size cassette; and a first reference hole for positioning said cassette case in said cassette recording/reproducing apparatus, wherein said first information means and said first reference hole have the same distance therebetween as between said second information means and said second reference hole of said second-size cassette.

10. A first-size cassette according to claim 9, wherein said first information means further includes a recognition hole which is adapted to provide an indication of at least one feature of said first-size cassette to said cassette recording/ reproducing apparatus.

11. A first-size cassette according to claim 9, wherein said cassette case includes upper and lower portions and wherein said terminal means is located on said lower portion of said cassette case.

12. A first-size cassette according to claim 11, further comprising an accidental erasure protection hole located in a bottom wall of said cassette case, said accidental erasure protection hole of said first-size cassette being located at the same position as in said second-size cassette.

13. A first-size cassette according to claim 12, further comprising a movable erase protect member for covering and uncovering said accidental erasure protection hole so as to provide an indication to said cassette recording/ reproducing apparatus as to whether signals may be recorded onto said recording medium, said erase protect member having means located in the upper portion of said cassette case for enabling a user to selectively move said erase protect member.

14. A first-size cassette according to claim 13, wherein said first plurality of electric and said means for enabling are arranged on a back wall of said cassette case such that said means for enabling is located above said first plurality of electric.

15. A first-size cassette according to claim 9, wherein a back side wall of said cassette case includes a recessed area adapted for adhering a label thereto.

16. A first-size cassette according to claim 15, wherein a distance between a bottom surface of a lower portion of said cassette case and a lower edge of said recessed area is substantially the same as that in said second-size cassette.

17. A cassette having one of a first-size and a second-size each being adapted for use with a common cassette recording/reproducing apparatus, each of said first-size and second-size cassette comprising:

a cassette case having a plurality of walls and holding a recording medium therein;

information means for providing information pertaining to the respective cassette to said cassette recording/ reproducing apparatus when said respective cassette is being used with said cassette recording/reproducing apparatus, said information means including electric terminal means having a plurality of electric terminals each having a width associated therewith which is substantially identical to a width of each electric terminal of the other of said first-size and second-size cassette and in which adjacent ones of said plurality of electric terminals are arranged so as to have a first predetermined distance therebetween which is the same as in said other cassette, said plurality of electric terminals being arranged so as to have a second predetermined distance between said plurality of electric terminals and an edge of a side wall nearest to said plurality of electric terminals which is the same as between a plurality of electric terminals and a corresponding edge in the other of said first-size and second-size cassette; and a reference hole for positioning said cassette case in said cassette recording/reproducing apparatus, said reference hole and said information means having a constant distance therebetween regardless of the size of said cassette.

18. A system for recording and/or reproducing signals comprising:

a recording/reproducing apparatus for recording and/or reproducing signals onto and/or from a recording medium; and a cassette having one of a first-size and a second-size each being adapted for use with said recording/reproducing apparatus, each of said first-size and second-size cassette including a cassette case having a plurality of walls and holding the recording medium therein, information means for providing information pertaining to the respective cassette to said recording/reproducing apparatus when said respective is being used with said cassette recording/reproducing apparatus in which said information means includes electric terminal means having a plurality of electric terminals each having a width associated therewith which is substantially identical to a width of each terminal of the other of said first-size and second-size cassette and in which adjacent ones of said plurality of electric terminals are arranged so as to have a first predetermined distance therebetween which is the same as in said other cassette and in which said plurality of electric terminals are arranged so as to have a second predetermined distance between said plurality of electric terminals and an edge of a side wall nearest to said plurality of electric terminals which is the same as between a plurality of electric terminals and a corresponding edge in the other of said first-size and second-size cassette, and a reference hole for positioning said cassette case in said recording/reproducing apparatus, said reference hole and said information means having a constant distance therebetween regardless of the size of said cassette.

19. A first-size cassette having a shape substantially the same as that of a second-size cassette which is larger than said first-size cassette and in which said first-size and second-size cassettes are insertable into a common cassette recording/reproducing apparatus, said second-size cassette having a second reference hole and second information means including a second plurality of electric terminals for providing information pertaining to said second-size cassette to said cassette recording/reproducing apparatus when said second-size cassette is inserted into said cassette recording/reproducing apparatus, said first-size cassette comprising:

a cassette case holding a recording medium therein and having upper and lower portions and a plurality of walls;

first information means for providing information pertaining to said first-size cassette to said cassette recording/reproducing apparatus when said first-size cassette is inserted into said cassette recording/reproducing apparatus, said first information means including a first plurality of electric terminals each having a width associated therewith which is substantially identical to a width of each electric terminal of said second plurality of electric terminals of said second-size cassette and in which adjacent ones of said first plurality of electric terminals are arranged so as to have a first predetermined distance therebetween which is the same as in said second-size cassette, said first plurality of electric terminals being arranged on the lower portion of a back wall of said cassette case so as to have a second predetermined distance between said first plurality of electric terminals and an edge of a side wall nearest to said first plurality of electric terminals and said second plurality of electric terminals being arranged on a lower portion of a back wall of said second-size cassette so as to have a third predetermined distance between said second plurality of electric terminals and an edge of a side wall nearest to said second plurality of electric terminals wherein said second predetermined distance is the same as said third predetermined distance of said second-size cassette;

a first reference hole for positioning said cassette case in said cassette recording/reproducing apparatus, wherein said first reference hole and said first information means have the same distance distance therebetween as said second reference hole and said second information means of said second-size cassette;

a first accidental erasure protection hole located in a bottom wall of said cassette case, said second-size cassette having a second accidental erasure protection hole which is located in a bottom wall of said second-size cassette, said first accidental erasure protection hole and said first reference hole of said first-size cassette having a distance therebetween which is the same as that between said second accidental erasure protection hole and said second reference hole of said second-size cassette; and a movable erase protect member for covering and uncovering said first accidental erasure protection hole so as to provide an indication to said cassette recording/reproducing apparatus as to whether signals may be recorded onto said recording medium, said erase protect member having a knob for enabling a user to selectively move said erase protect member so as to cover and uncover said first accidental erasure protection hole, said erase protect member further having an indication portion for providing an indication to said user as to whether signals may be recorded onto said recording medium, said knob and said indication portion being arranged on the upper portion of the back wall of said cassette case above said first plurality of electric terminals.

20. A first-size cassette having a shape substantially the same as that of a second-size cassette which is smaller than said first-size cassette and in which said first-size and second-size cassettes are insertable into a common cassette recording/reproducing apparatus, said second-size cassette having a second reference hole and second information means including a second plurality of electric terminals for providing information pertaining to said second-size cassette to said cassette recording/reproducing apparatus when said second-size cassette is inserted into said cassette recording/reproducing apparatus, said first-size cassette comprising;

a cassette case holding a recording medium therein and having upper and lower portions and a plurality of walls;

first information means for providing information pertaining to said first-size cassette to said cassette recording/reproducing apparatus when said first-size cassette is inserted into said cassette recording/reproducing apparatus, said first information means including a first plurality of electric terminals each having a width associated therewith which is substantially identical to a width of each electric terminal of said second plurality of electric terminals of said second-size cassette and in which adjacent ones of said first plurality of electric terminals are arranged so as to have a first predetermined distance therebetween which is the same as in said second-size cassette, said first plurality of electric terminals being arranged on the lower portion of a back wall of said cassette case so as to have a second predetermined distance between said first plurality of electric terminals and an edge of a side wall nearest to said first plurality of electric terminals and said second plurality of electric terminals being arranged on a lower portion of a back wall of said second-size cassette so as to have a third predetermined distance between said second plurality of electric terminals and an edge of a side wall nearest to said second plurality of electric terminals wherein said second predetermined distance is the same as said third predetermined distance of said second-size cassette;

a first reference hole for positioning said cassette case in said cassette recording/reproducing apparatus, wherein said first reference hole and said first information means have the same distance therebetween as said second reference hole and said second information means of said second-size cassette;

a first accidental erasure protection hole located in a bottom wall of said cassette case, said second-size cassette having a second accidental erasure protection hole which is located in a bottom wall of said second-size cassette, said first accidental erasure protection hole and said first reference hole of said first-size cassette having a distance therebetween which is the same as that between said second accidental erasure protection hole and said second reference hole of said second-size cassette; and a movable erase protect member for covering and uncovering said first accidental erasure protection hole so as to provide an indication to said cassette recording/reproducing apparatus as to whether signals may be recorded onto said recording medium, said erase protect member having a knob for enabling a user to selectively move said erase protect member so as to cover and uncover said first accidental erasure protection hole, said erase protect member further having an indication portion for providing an indication to said user as to whether signals may be recorded onto said recording medium, said knob and said indication portion being arranged on the upper portion of the back wall of said cassette case above said first plurality of electric terminals.

* * * * *